United States Patent
Li et al.

(10) Patent No.: US 12,219,454 B2
(45) Date of Patent: *Feb. 4, 2025

(54) ENHANCEMENT TO REDUNDANT TRANSMISSION IN 5G NETWORK

(71) Applicant: InterDigital Patent Holdings, Inc., Wilmington, DE (US)

(72) Inventors: Hongkun Li, Malvern, PA (US); Michael Starsinic, Newtown, PA (US); Quang Ly, North Wales, PA (US); Catalina Mladin, Hatboro, PA (US); Jiwan Ninglekhu, Royersford, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/743,809

(22) Filed: Jun. 14, 2024

(65) Prior Publication Data

US 2024/0349158 A1     Oct. 17, 2024

Related U.S. Application Data

(63) Continuation of application No. 18/254,024, filed as application No. PCT/US2021/060761 on Nov. 24, 2021.

(60) Provisional application No. 63/118,110, filed on Nov. 25, 2020.

(51) Int. Cl.
*H04W 4/00*      (2018.01)
*H04W 24/04*     (2009.01)
*H04W 40/02*     (2009.01)
*H04W 76/15*     (2018.01)

(52) U.S. Cl.
CPC .......... *H04W 40/02* (2013.01); *H04W 24/04* (2013.01); *H04W 76/15* (2018.02)

(58) Field of Classification Search
CPC ...... H04W 40/02; H04W 76/15; H04W 24/04
USPC ......................................................... 370/328
See application file for complete search history.

(56) References Cited

U.S. PATENT DOCUMENTS

| | | | | |
|---|---|---|---|---|
| 11,523,303 B2 * | 12/2022 | Hong | .................... | H04W 80/02 |
| 11,601,954 B2 * | 3/2023 | Gao | ........................ | H04W 80/02 |
| 11,729,848 B2 * | 8/2023 | Yilmaz | ................. | H04W 76/16 |
| | | | | 370/329 |
| 11,743,965 B2 * | 8/2023 | Park | ...................... | H04W 76/25 |
| | | | | 370/329 |
| 11,751,112 B2 * | 9/2023 | Wang | .............. | H04W 36/00695 |
| | | | | 370/331 |

(Continued)

FOREIGN PATENT DOCUMENTS

| WO | WO 2019/130048 A1 | 7/2019 |
|---|---|---|
| WO | WO 2020/107751 A1 | 6/2020 |

(Continued)

OTHER PUBLICATIONS

3rd Generation Partnership Project (3GPP), Technical Specification Group Services and System Aspects, System Architecture for the 5G System (5GS), Stage 2, Release 16, 3GPP TS 23.501 V16.6.0, Sep. 2020, pp. 1-450.

(Continued)

*Primary Examiner* — Marceau Milord
(74) *Attorney, Agent, or Firm* — Flaster Greenberg P.C.

(57) ABSTRACT

Methods, systems, and devices may assist in policy and parameters provision to network to support the redundant transmission configuration.

22 Claims, 17 Drawing Sheets

(56) References Cited

U.S. PATENT DOCUMENTS

| | | | |
|---|---|---|---|
| 11,765,617 B2* | 9/2023 | Guo | H04W 12/106 370/229 |
| 11,778,535 B2* | 10/2023 | Zhang | H04W 76/15 370/328 |
| 11,792,871 B2* | 10/2023 | Lanev | H04W 8/18 370/329 |
| 12,004,012 B2 | 6/2024 | Shi | |
| 12,096,253 B2 | 9/2024 | Kahn et al. | |
| 2017/0265187 A1* | 9/2017 | Chen | H04B 7/15507 |
| 2018/0199315 A1* | 7/2018 | Hong | H04W 76/15 |
| 2018/0279401 A1 | 9/2018 | Hong et al. | |
| 2018/0367288 A1* | 12/2018 | Vrzic | H04W 76/12 |
| 2019/0253917 A1* | 8/2019 | Dao | H04W 28/0268 |
| 2019/0357262 A1* | 11/2019 | Cirik | H04W 80/02 |
| 2020/0145876 A1* | 5/2020 | Dao | H04L 12/1407 |
| 2021/0021376 A1* | 1/2021 | Srivastava | H04W 28/04 |
| 2021/0105196 A1* | 4/2021 | Dao | H04L 43/026 |
| 2021/0105697 A1 | 4/2021 | Xu et al. | |
| 2021/0297931 A1 | 9/2021 | Zhang et al. | |
| 2021/0345178 A1 | 11/2021 | Shi | |
| 2021/0345203 A1* | 11/2021 | Balasubramanian | H04W 36/304 |
| 2021/0345204 A1* | 11/2021 | Matolia | H04W 36/00698 |
| 2021/0352525 A1 | 11/2021 | Hong | |
| 2021/0352546 A1 | 11/2021 | Wang et al. | |
| 2022/0060942 A1* | 2/2022 | Jeon | H04L 43/0852 |
| 2022/0070969 A1 | 3/2022 | Xiao et al. | |
| 2022/0141909 A1 | 5/2022 | Wu et al. | |
| 2022/0174514 A1 | 6/2022 | Kahn et al. | |
| 2022/0191720 A1* | 6/2022 | Cui | H04L 5/0048 |
| 2022/0303070 A1 | 9/2022 | Kahn et al. | |
| 2022/0312312 A1* | 9/2022 | Gurumoorthy | H04W 52/0209 |
| 2022/0338290 A1 | 10/2022 | Yilmaz et al. | |

FOREIGN PATENT DOCUMENTS

| | | |
|---|---|---|
| WO | WO 2020/204949 A1 | 10/2020 |
| WO | WO 2022/034030 A1 | 2/2022 |

OTHER PUBLICATIONS

3rd Generation Partnership Project (3GPP), Technical Specification Group Services and System Aspects, "Procedures for the 5G System (5GS)", Stage 2, Release 16, 3GPP TS 23.502 V16.6.0, Sep. 2020, pp. 1-600.

3rd Generation Partnership Project (3GPP), Technical Specification Group Services and System Aspects, "Architecture Enhancements to Facilitate Communications with Packet Data Networks and Applications" (Release 15), 3GPP TS 23.682 V15.0.0, Mar. 2017, pp. 1-109.

Ericsson, "Evaluation of Solution #1: Redundant user plane paths based on dual connectivity", 3GPP Draft, S2-1810109, Oct. 2018, pp. 8.

Nokia et al., "Clarification on UE provides POU Session Pair ID based on URSP rules", 3GPP TSG-WG SA2 Meeting #145E e-meeting, S2-2104689, May 2021, pp. 5.

Nokia et al., "New WID: System enhancement for Redundant POU Session", 3GPP TSG SA2 Meeting #137E, S2-2002209, Feb. 2020, pp. 3.

SP-200448: TE117_SR_RPS—New WID: System enhancement for redundant POU Session; 3GPP TSG SA Meeting #88E, Jun. 30-Jul. 3, 2020, pp. 1-3.

ZTE, "Discussion on redundant POU Sessions in solution1", 3GPP Draft; R3-192233, May 2019, pp. 5.

3rd Generation Partnership Project; "Discussion on open issues for Solution #1", R3-203911, 3GPP TSG-RAN WG3 #108-e E-Meeting, Jun. 1-11, 2020, 3 pages.

3rd Generation Partnership Project; "Draft CR: 5G URLLC Handling redundant PDU Sessions", S2-2003178, SA WG2 Meeting #138E Elbonia, Apr. 20-23, 2020, 5 pages.

3rd Generation Partnership Project; "Indication of redundancy transmission", S2-2009343, SA WG2 Meeting #S2-142E, Nov. 16-20, 2020, 5 pages.

* cited by examiner

ENHANCEMENT TO REDUNDANT TRANSMISSION IN 5G NETWORK

CROSS-REFERENCE TO RELATED APPLICATIONS

This application is a continuation of U.S. Non-Provisional patent application Ser. No. 18/254,024, filed May 23, 2023, which is the National Stage Application of International Patent Application No. PCT/US2021/060761, filed Nov. 24, 2021, which claims the benefit of U.S. Provisional Patent Application No. 63/118,110, filed on Nov. 25, 2020, entitled "Enhancement To Redundant Transmission In 5G Network," the contents of which are hereby incorporated by reference herein.

BACKGROUND

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to include a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

This background information is provided to reveal information believed by the applicant to be of possible relevance. No admission is necessarily intended, nor should be construed, that any of the preceding information constitutes prior art.

SUMMARY

Disclosed herein are methods, systems, and devices with regard to the redundant transmission for URLLC application, PDU session establishment or modification process, or URSP enhancement for UL traffic duplication at PDU layer. In particular, several issues are addressed related to the existing mechanism of enabling and supporting the redundant transmission that are specified in the specification. The disclosed subject matter may enhance the redundant transmission mechanisms.

Disclosed herein are policies and parameters provision to network to support the redundant transmission configuration. Described in more detail is how RSN and the redundant user plane requirement are tied, and a list of parameters and policy rule provided from PCF to SMF for redundant transmission decision and configuration. AF may also provide inputs to PCF, which may impact the parameters and policy rules.

Disclosed herein are procedures where the UE provides PDU session pair information to the core network so that that it can be provided to the RAN node to enable dual connectivity based redundant transmission. Described in more detail is the format of PSPI and what information PSPI includes, procedures for PSPI generation and provisioning to RAN node, and how the UE may determine to make PDU Sessions Redundant based on an indication from the application layer.

Disclosed herein are methods of PDU session modification for redundant transmission. Described in more detail are possible triggers at different network entities (UE, RAN node, AF and SMF), and procedures to disable or stop the redundant transmission or continue the redundant transmission by replacing one of PDU session in the session pair.

Disclosed herein are enhancements to URSP rule to allow UE to perform traffic duplication and elimination at PDU layer. Described in more detail is subject matter in which the UE may determine to utilize redundancy and the determination is made independent of the application layer.

In an example, a method may include receiving configuration information for assigning packet data unit (PDU) session pair information (PSPI) to one or more PDU sessions; using the configuration information to determine that a first PDU session and a second PDU session are associated; associating, based on the configuration, the first PSPI to the first PDU session and the second PDU session; sending, to a network, the PSPI in a first PDU session establishment message to establish the first PDU session; and sending, to the network, the PSPI in a second PDU session establishment message to establish the second PDU session.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

5G Network Architecture

Figure 1:
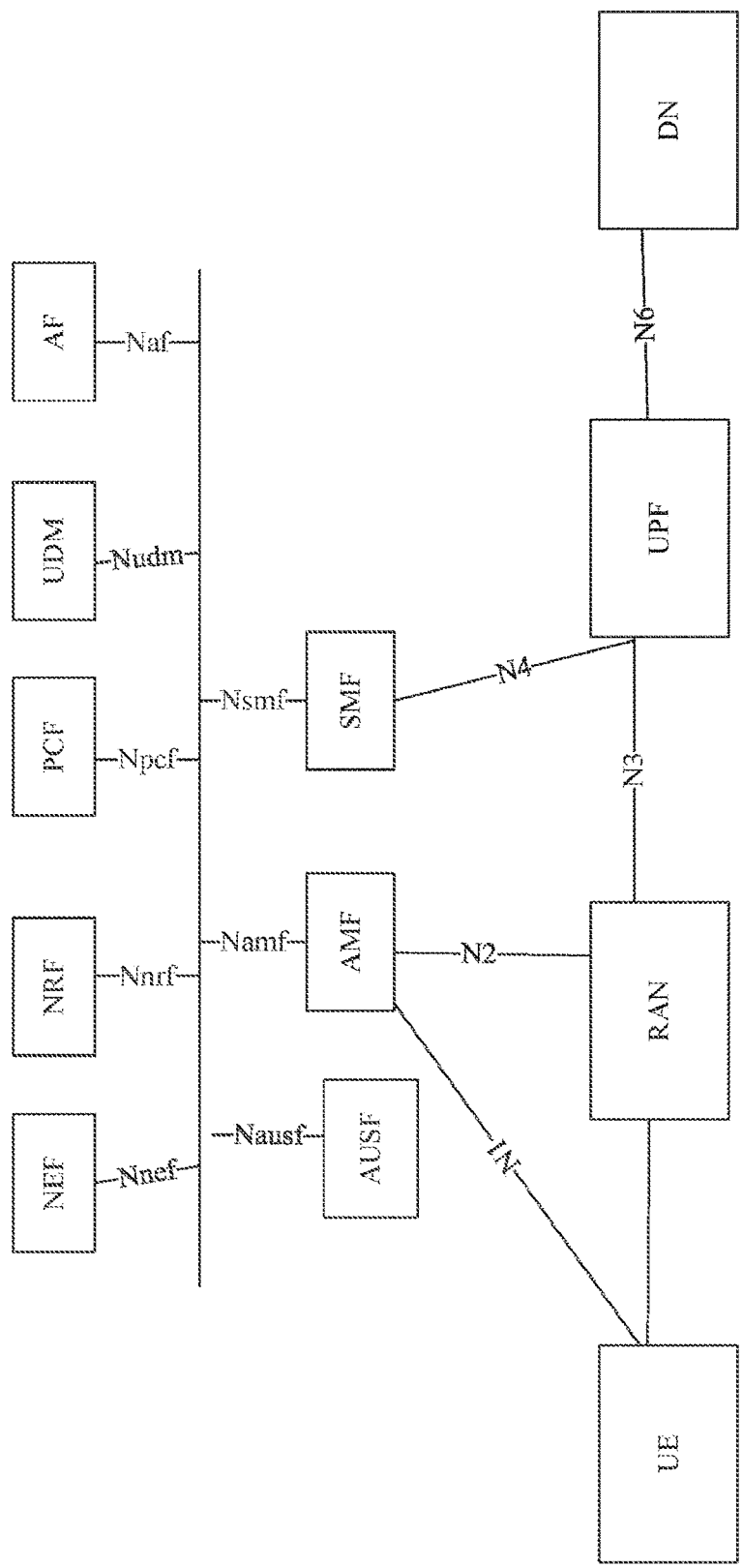
FIG. 1 illustrates an exemplary 5G system service-based architecture.

FIG. 1 depicts a 5G System in the non-roaming reference architecture with service-based interfaces within the Control Plane.

Figure 2:
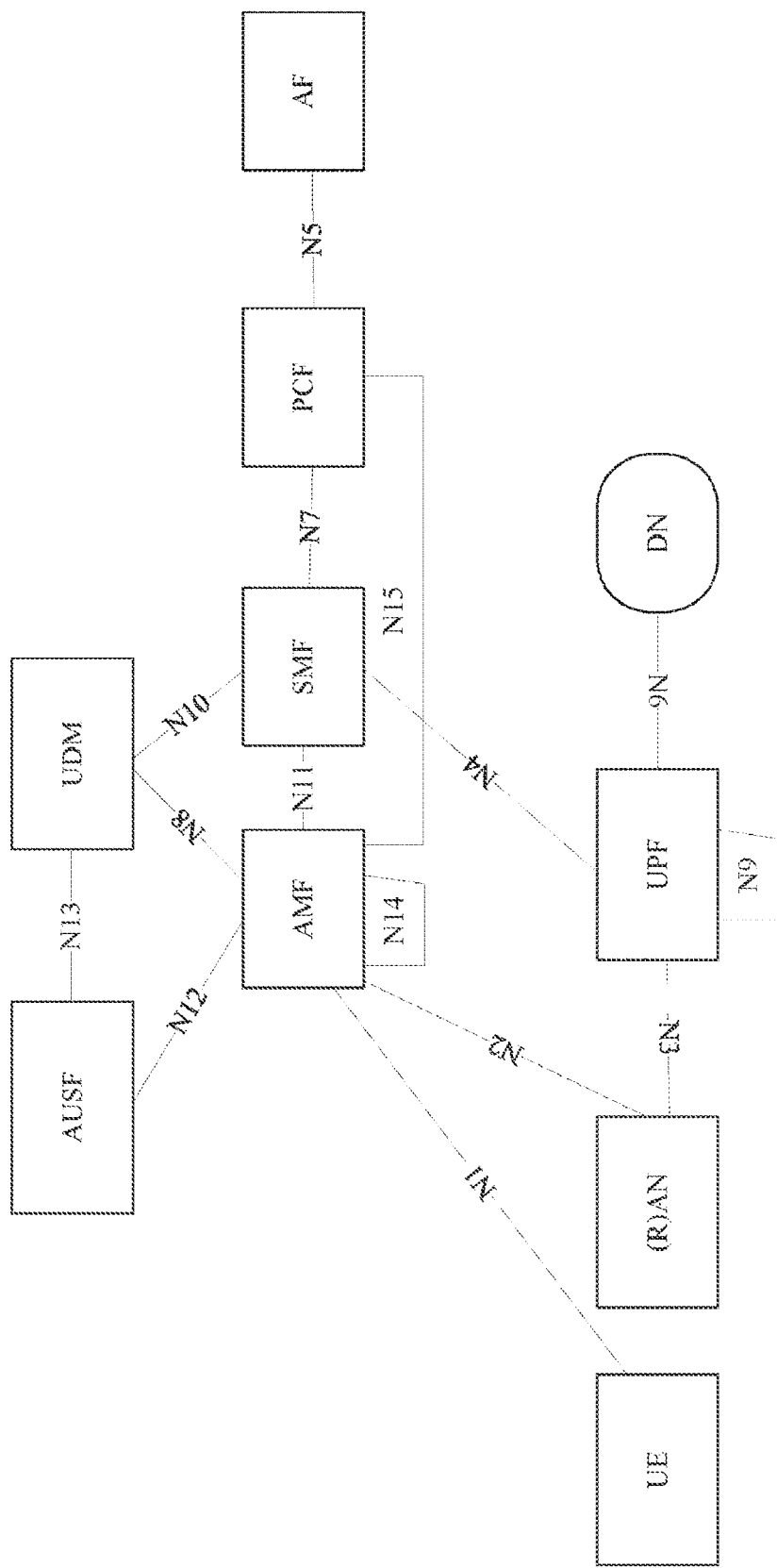
FIG. 2 illustrates an exemplary non-roaming 5G system architecture in reference point representation.

FIG. 2 depicts a 5G System architecture in the non-roaming case, using the reference point representation showing how various network functions interact with each other.

The end-to-end communications, between the Application in the UE and the Application in the external network, uses services provided by the 3GPP system, and optionally services provided by a Services Capability Server (SCS), which resides in the DN.

User Plane Protocol Stack and PDU Sessions

The 5GC supports a PDU Connectivity Service i.e. a service that provides exchange of PDUs between a UE and a data network identified by a Data Network Name (DNN). The PDU Connectivity Service is supported via PDU Sessions that are established upon request from the UE. PDU Sessions are established (upon UE request), modified (upon UE and 5GC request) and released (upon UE and 5GC request) using NAS SM signaling exchanged over N1 interface between the UE and the SMF via AMF. Upon request from an Application Server, the 5GC is able to trigger a specific application in the UE. When receiving that trigger message, the UE passes it to the identified application in the UE. The identified application in the UE may establish a PDU Session to a specific DNN.

A PDU Session may be associated to an S-NSSAI or a DNN. In a PDU Session establishment request sent to the network, the UE provides a PDU Session Identifier. The PDU Session ID is unique per UE and is the identifier used to uniquely identify one of a UE's PDU Sessions. PDU Session ID shall be stored in the UDM to support handover between 3GPP and non-3GPP accesses when different PLMNs are used for the two accesses.

Each PDU Session supports a single PDU Session type i.e. supports the exchange of a single type of PDU requested by the UE at the establishment of the PDU Session. The following PDU Session types are defined: IPv4, IPv6, IPv4v6, Ethernet, Unstructured.

A UE may establish multiple PDU Sessions, to the same data network or to different data networks, via 3GPP and via and Non-3GPP access networks at the same time. A UE may establish multiple PDU Sessions to the same Data Network and served by different UPF terminating N6. A UE with multiple established PDU Sessions may be served by different SMFs. The SMF serving a PDU session (e.g., Anchor) does not change during lifetime of the PDU session.

Figure 3:
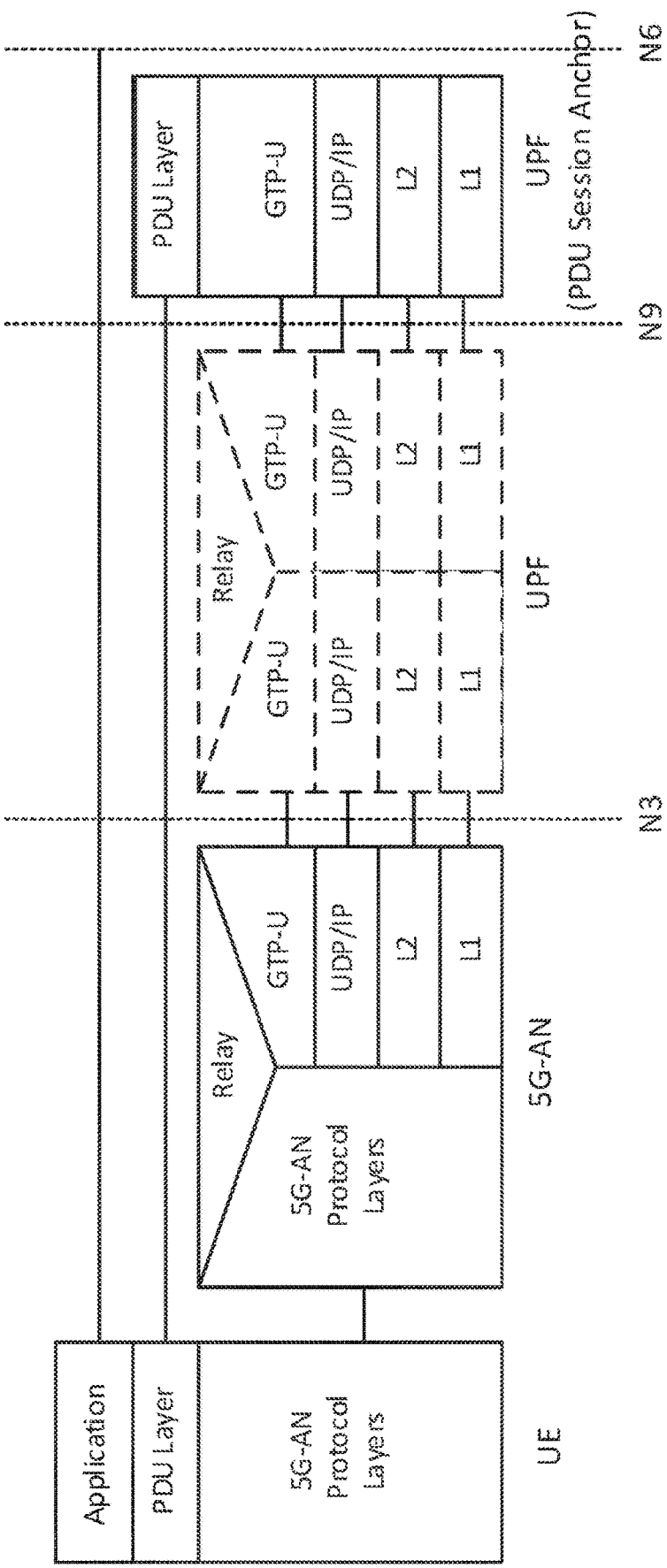
FIG. 3 illustrates an exemplary User Plane Protocol Stack.

FIG. 3 illustrates the protocol stack for the User plane transport related with a PDU Session.

Redundant PDU Sessions

Redundant transmission for high reliability communication is specified in TS 23.501 to enhance 5GS to support Ultra Reliable Low Latency Communication (URLLC). When a PDU Session is to serve URLLC QoS Flow, the UE and SMF should establish the PDU Session as always-on PDU Session. An always-on PDU session is a PDU Session for which User Plane resources have to be activated during every transition from CM-IDLE mode to CM-CONNECTED state. Based on an indication from upper layers, a UE may request to establish a PDU Session as an always-on PDU Session. The SMF decides whether the PDU Session can be established as an always-on PDU Session. In order to support the URLLC high reliability communication, there are 3 options specified in TS 23.501:

Dual Connectivity based on end to end Redundant User Plane Paths

Support of redundant transmission on N3/N9 interfaces

Support for redundant transmission at transport layer

As described in TS 37.340, NG-RAN may realize the redundant user plane resources for the two redundant PDU sessions with two NG-RAN nodes (i.e. Master NG-RAN and Secondary NG-RAN) or a single NG-RAN node (for redundant transmission on N3/N9 interfaces). In all cases, there is a single N1 interface towards AMF.

Dual Connectivity Based on End to End Redundant User Plane Paths

Figure 4:
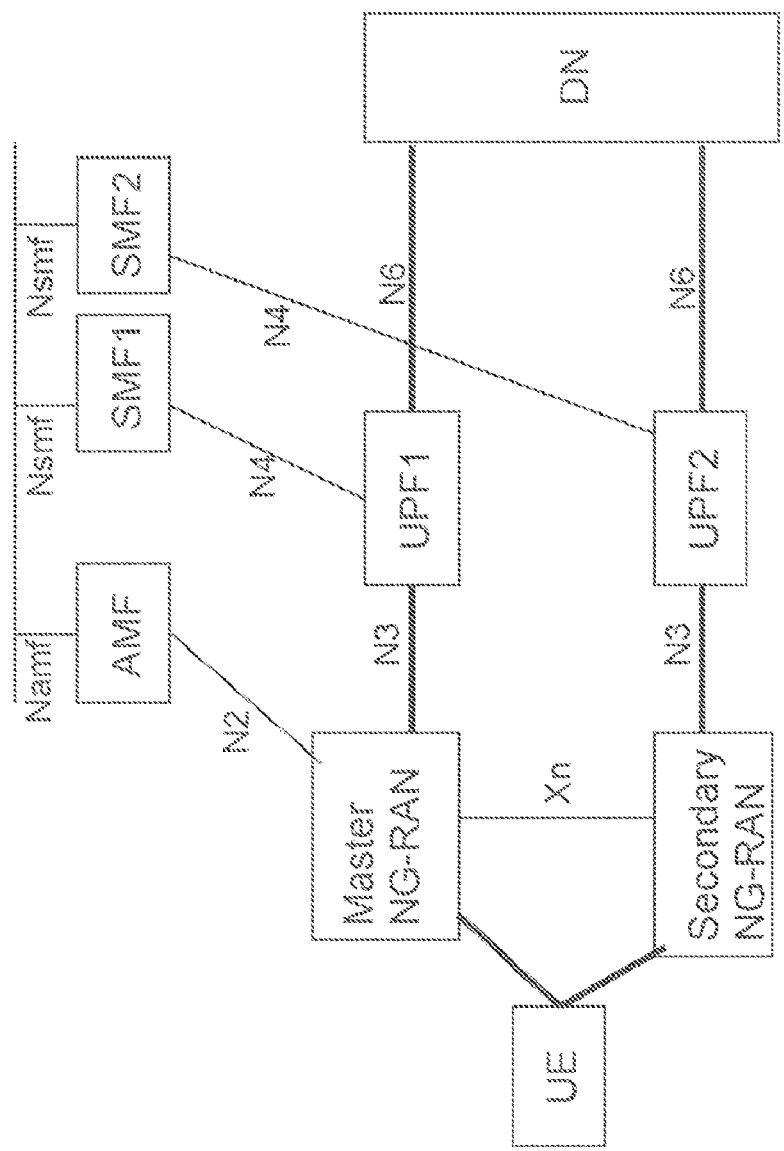
FIG. 4 illustrates an exemplary scenario for end to end redundant user plane paths using dual connectivity.

FIG. 4 illustrates an example user plane resource configuration of dual PDU sessions when redundancy is applied. A UE may set up two redundant PDU Sessions over the 5G network, such that the 5GS sets up the user plane paths of the two redundant PDU Sessions to be disjoint. The UE's subscription indicates if UE is allowed to have redundant PDU Sessions and this indication is provided to SMF from UDM. One PDU Session spans from the UE via Master NG-RAN to UPF1 acting as the PDU Session Anchor, and the other PDU Session spans from the UE via Secondary NG-RAN to UPF2 acting as the PDU Session Anchor. Based on these two PDU Sessions, two independent user plane paths are set up. UPF1 and UPF2 connect to the same Data Network (DN), even though the traffic via UPF1 and UPF2 may be routed via different user plane nodes towards the DN.

UE initiates establishment of two redundant PDU Sessions and provides different combination of DNN and S-NSSAI for each PDU Session. The SMF determines whether the PDU Session is to be handled redundantly based on the policies provided by PCF for the PDU Session, and the combination of the S-NSSAI, DNN, user subscription and local policy configuration. Moreover, the SMF determines the Redundant Sequence Number (RSN), which differentiates the PDU Sessions that are handled redundantly. PDU Sessions associated with different RSN values shall be realized by different, redundant UP resources. RSN indicates to NG-RAN that redundant user plane resources shall be provided for the given PDU sessions by means of dual connectivity. Request for redundant handling is made by indicating the RSN to NG-RAN on a per session granularity. The value of the RSN parameter indicates redundant user plane requirements for the PDU Sessions.

Duplicated traffic from the application, associated with the redundant PDU Session, is differentiated by two distinct traffic descriptors, each in a distinct URSP rule. These traffic descriptors need to have different DNNs, IP descriptors or non-IP descriptors (e.g. MAC address, VLAN ID), so that the two redundant PDU sessions are matched to the RSD of distinct URSP rules. How to make use of the duplicate paths for redundant traffic delivery end-to-end is out of scope of 3GPP. It is possible to rely on upper layer protocols, such as the IEEE TSN (Time Sensitive Networking) or FRER (Frame Replication and Elimination for Reliability), to manage the replication and elimination of redundant packets/frames over the duplicate paths which can span both the 3GPP segments and possibly fixed network segments as well. In other words, upper layer is responsible for traffic duplication and elimination in this scenario.

Support of Redundant Transmission on N3/N9 Interfaces

Figure 5:
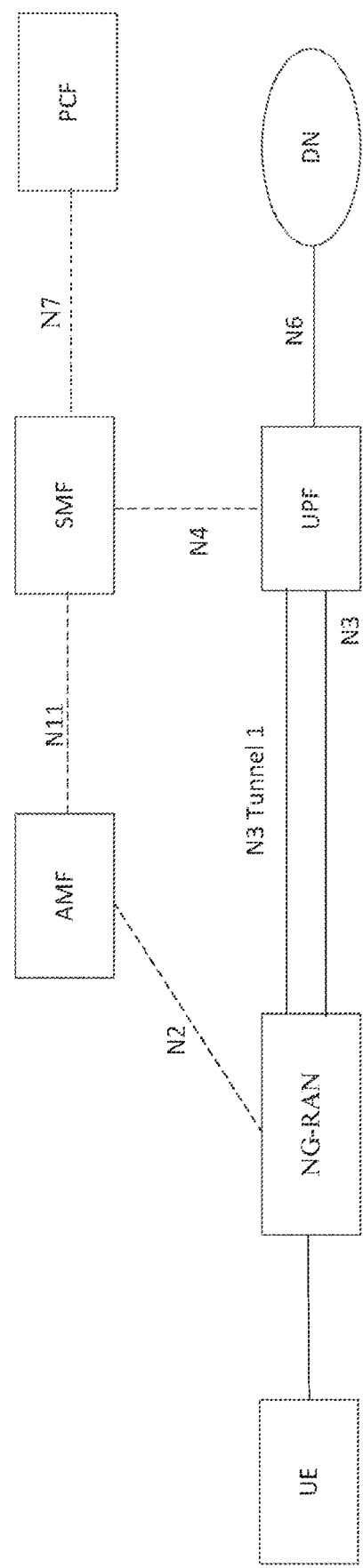
FIG. 5 illustrates an exemplary redundant transmission with two N3 tunnels between the PSA UPF and a single NG-RAN node.

FIG. 5 illustrates the case that the redundant transmission is performed only on N3 interface.

If the reliability of NG-RAN node, UPF and CP NFs are high enough to fulfill the reliability requirement of URLLC services served by these NFs, but the reliability of a single N3 tunnel is considered not high enough, e.g. due to the deployment environment of backhaul network, the redundant transmission may be deployed between PSA UPF and NG-RAN via two independent N3 tunnels, which are associated with a single PDU Session, over different transport layer path to enhance the reliability.

To ensure the two N3 tunnels are transferred via disjointed transport layer paths, the SMF or PSA UPF should provide different routing information in the tunnel information (e.g. different IP addresses or different Network Instances), and these routing information should be mapped to disjoint transport layer paths according to network deployment configuration. The SMF indicates NG-RAN and PSA UPF that one of the two CN/AN Tunnel Info is used as the redundancy tunnel of the PDU Session accordingly. The redundant transmission using the two N3/N9 tunnels are performed at QoS flow granularity and are sharing the same QoS Flow ID.

If duplicate transmission is performed on N3/N9 interface, for each downlink packet of the QoS Flow the PSA UPF received from DN, the PSA UPF replicates the packet and assigns the same GTP-U sequence number to them for the redundant transmission. The NG-RAN eliminates the duplicated packets based on the GTP-U sequence number and then forwards the PDU to the UE.

For each uplink packet of the QoS Flow the NG-RAN received from UE, the NG-RAN replicates the packet and assigns the same GTP-U sequence number to them for redundant transmission. These packets are transmitted to the PSA UPF via two N3 Tunnels separately. The PSA UPF eliminates the duplicated packet based on the GTP-U sequence number accordingly.

Support for Redundant Transmission at Transport Layer

Redundant transmission can be supported within the 5G System without making any assumption on support for protocols such as IEEE FRER in the application layer (DN only) at the same time it can be supported without requiring redundant GTP-U tunnel over N3. The backhaul provides two disjoint transport paths between UPF and NG-RAN. The redundancy functionality within NG-RAN and UPF make use of the independent paths at transport layer. Support of redundant transmission at transport layer requires no 3GPP protocol impact. Following are the steps.

In a first step, UE establishes the PDU session for URLLC services. Based on DNN, S-NSSAI, knowledge of supporting redundant transmission at transport layer and other factors as described in clause 6.3.3, SMF selects a UPF that supports redundant transmission at transport layer for the PDU session. One N3 GTP-U tunnel is established between UPF and NG-RAN.

In a second step, the knowledge of supporting redundant transmission at transport layer can be configured in the SMF or be configured in UPF and then obtained by the SMF via N4 capability negotiation during N4 Association setup procedure.

In a third step, for DL data transmission, UPF sends the DL packets on N3 GTP-U tunnel. Redundant functionality in the UPF duplicates the DL data on the transport layer. Redundant functionality in the NG-RAN eliminates the received duplicated DL data and sends to NG-RAN In a fourth step, for UL data transmission, NG-RAN sends the received UL packets on N3 GTP-U tunnel, the Redundant functionality in the NG-RAN performs the redundant handling on the backhaul transport layer. The Redundant functionality in the UPF eliminates the received duplicated UL data and sends to UPF.

System Enhancement for Redundant PDU Session

Several possible enhancements have been identified with respect to the existing redundant PDU session mechanism that is specified in TS 23.501. Specifically, 3GPP SA2 working group lists several potential objectives as follows to further enhance the current redundant PDU session mechanism as shown in SP-200448: TEI17_SE_RPS—New WID: System Enhancement for Redundant PDU Session.

With regard to a first objective, if the UE has knowledge about PDU Session pair information for the redundant PDU Sessions, it is disclosed that the UE provides PDU Session pair information to the SMF(s) so that the SMF(s) can provide this information to the NG-RAN, and that the NG-RAN can eventually use the information for SN selection, also gNB CU/DU Selection. This would allow the two PDU Sessions to be independently established without any constraints on the selected SMF(s).

With regard to a second objective, if the UE releases one of the redundant PDU sessions and establishes the third PDU Session, the previous PDU Session pair information can be used for coordination with the new established PDU session.

With regard to a third objective, how the UE obtains the knowledge of PDU Session pair information for the redundant PDU Sessions needs to be clarified.

Considerations

The redundant PDU session was defined for supporting high reliability communication for URLLC applications. In the dual connectivity (DC) based scenario, a new parameter called RSN is defined and is associated with a PDU session that is handled redundantly, so that network functions and the RAN node knows that the PDU session is a redundant PDU session and user plane resources for the PDU session can be allocated accordingly. In addition, RSN is determined by SMF and is used to indicate and differentiate the PDU Sessions that are handled redundantly. In other words, different RSN values indicate redundant user plane requirements, which leads to different but redundant user plane resource allocation for the PDU session. However, there are still some issues as follows that are not addressed.

With regard to a first issue, how to assign the RSN value to indicate a redundant user plane requirement is not defined. In fact, the meaning of redundant user plane requirement is not defined. In current specification, there is no mechanism specified to illustrate how to define the redundant user plane requirement and whether it should be associated with certain standardized attributes such as QoS requirement/parameters.

With regard to a second issue, it is mentioned in TS 23.501 that that the SMF determines whether the PDU Session is to be handled redundantly based on the policies provided by PCF. However, the current network design is that the SMF makes this determination based on local configuration. This approach is not very scalable; it would be preferable if a policy engine (i.e. the PCF) could be used to help guide the SMF in making this determination. The SMF determines the RSN value based on local configuration; overall system performance could be improved if the SMF assigned the RSN such that the RAN could use the RSN to determine which PDU Sessions are linked.

With regard to a third issue, RSN can only indicate that a PDU session is handled redundantly with certain redundant user plane requirements. However, it does not indicate which 2 PDU sessions are associated together as a pair of redundant PDU session for the redundant transmission. In other words, network functions and the RAN node do not know which 2 PDU sessions are bind together for redundant transmission. This may be important for DC based scenario, where the master RAN node will need the information to select the secondary RAN node by considering the PDU session context information.

With regard to a fourth issue, in order to provide the RAN node with the PDU session pair information (PSPI), the network needs to have such information. However, there is no mechanisms defined on how the network (e.g., SMF) can get this information. Since the 2 sessions are managed independently, it is likely that 2 separate SMFs will manage the 2 PDU sessions. It cannot be assumed that these two SMFs is able to communicate. There is no existing mechanism that allows these 2 SMFs to exchange such session management information. In fact, each SMF is not aware that another redundant PDU session has been established.

With regard to a fifth issue, how to provide the PDU session pair information to other network entities (e.g., RAN node and AF) is not addressed. Usually, SMF should be responsible for providing such session management related information. However, as discussed above, SMF may not be able to provide such information.

With regard to a sixth issue, only UE can trigger the redundant PDU session establishment/modification, while application server (e.g., AF or SCS/AS) should be able to do so by providing necessary information to network (e.g., SMF or PCF) for policy generation and parameter provisioning. However, no mechanism is defined to enable application server to do so. In addition, application server may request to be notified when 2 redundant PDU sessions are established for an application traffic. Given the fact that 2 different SMFs may manage the PDU sessions respectively, it is desirable to specify some mechanisms about how application server subscribes to which network entity for such event and how to deliver the notification to the AF or SCS/AS.

With regard to a seventh issue, another issue is about the redundant session modification. When network/UE/application server decide to stop redundant transmission by release/deactivate one PDU session, and then decide to associate the remaining PDU session with another PDU session for redundant transmission later on, RAN node and the anchor UPF needs to be notified to adjust the user plane resource allocation and traffic duplication/elimination operation. This can be done mainly based on RSN and PDU session pair information. However, there is no existing mechanism during the PDU session modification procedure to provide this information for redundant transmission.

With regard to an eighth issue, existing mechanism relies on the upper layer (e.g., application layer and transport layer) on traffic duplication and elimination for the DC based redundant transmission. In other words, for UL traffic, the UE just simply applies 2 separate URSP rules to find 2 redundant PDU sessions to transfer the same UL application traffic respectively. It would be more efficient if the traffic duplication and elimination can be handled at PDU layer. This approach can allow the redundant transmission more dynamically. For example, the UE or UPF may decide whether to send the application traffic to 1 PDU session (i.e., no redundant transmission) or to 2 PDU sessions (i.e., redundant transmission) based on the network condition dynamically. Under current URSP mechanism, it is not possible for a UE to send the same UL traffic to 2 PDU sessions. Therefore, some URSP enhancement is required so the UE is able to duplicate the traffic and send it to 2 PDU sessions.

In consideration on the aforementioned issues, some new information elements and new mechanisms are desired to enhance the existing redundant PDU session method.

Disclosed herein is the redundant transmission for URLLC application in 5GC. In particular, several issues are addressed related to the existing mechanism of enabling and supporting the redundant transmission that are specified in the specification. The following ideas are disclosed to enhance the redundant transmission mechanisms:

The subject matter disclosed herein may be based on the following principles. A first principle, since RSN is only used for dual connectivity (DC) based redundant transmission, the disclosed approaches can be assumed specific to the DC based mechanism unless it is explicitly mentioned for other mechanism (i.e., N3/N9 tunnel based). Moreover, the PDU session pair information is also defined only for DC based mechanism. However, the concept of r user plane redundant requirement is general for all the mechanisms (i.e., DC based, N3/N9 tunnel based and transport layer support) to support the redundant transmission. A second principle, PDU sessions established in dual connectivity-based mechanism are managed by different SMFs (e.g., at least two), and these SMFs may not communicate directly with each other.

Redundant User Plane Requirement and RSN

Disclosed below is policy and parameter provisioning from PCF/AF for redundant transmission. RSN indicates the redundant user plane requirements and may be configured multiple ways. For example, it may be configured to indicate one or more specific performance metric requirement for the application data transfer, for example, packet loss rate or latency threshold. Therefore, the redundant user plane requirement could be tied with certain QoS parameters or characteristics to reflect the performance metric. PCF will provide this mapping to SMF, which will associate the RSN value with a PDU session for redundant transmission. The redundant user plane requirement could be configured per application traffic identified by application ID, per UE, per PDU session, per QoS flow, or per DNN/S-NSSAI.

Policy and Parameter Provisioning for Redundant Transmission

SMF needs some information to decide whether a PDU session should be a redundant PDU session and the RSN value to indicate the redundant user plane requirement. PCF could provide these policy and parameters to SMF. The PCF may provide the following information to SMF so that SMF can make decision related to redundant transmission:

First, information may include a set of combinations of DNN and S-NSSAIs that may require redundant transmission support.

Second, information may include for each set of DNN and S-NSSAIs, an indication to indicate which redundant transmission option is supported, (e.g., whether DC based, N3/N9 tunnel based, or transport layer redundant transmission may be required. If there are multiple options supported, each option may be associated with a preference value, which shows the preference of each option.

Third, information may include a mapping between QoS requirement (indicated through one or multiple QoS parameters or QoS characteristics, e.g., 5QI, Maximum Packet Loss Rate, Packet Delay Budget) or service requirement and an RSN value or range of RSN values. This may be used by SMF to set up RSN value to reflect the redundant user plane requirement. Alternatively, PCF may provide a mapping between SDF and an RSN value or range of RSN values. Specifically, PCF may set up some threshold on some performance metrics (e.g., QoS characteristics or parameters) to SMF, so that SMF can set up the RSN value.

Fourth, information may include PLMN information (e.g., PLMN ID) or location information (e.g., TA, RA or geographic location area) which may be provided by the PCF to indicate where the redundant transmission can be applied for the given DNN and S-NSSAIs.

Fifth, information may be from a reporting event/condition that may trigger the SMF to notify PCF/AF about any change of the redundant transmission configuration. For example, when redundant transmission is enabled/disabled for an application traffic, when one of the redundant PDU session or one of N3/N9 tunnel is released or deactivated, when QoS at one of redundant session/tunnel is not met or needs some change, when the PDU session pair information (PSPI) is updated due to certain reasons.

Sixth, information may be information associated with how PSPI is constructed. For example, PCF may indicate that PSPI should include two PDU session IDs that are associated together for redundant transmission plus two SMF IDs that manage each PDU session respectively. Alternatively, PSPI could be a number or an ID (e.g., PDU session pair ID), which is used as a reference to the session information (session ID+SMF ID). More details about PSPI are disclosed herein.

Seventh information may be information on where the PSPI is stored. The PSPI information may be stored in UDM/UDR or SMF. In case that 2 SMFs manage a pair of PDU session respectively, storing PSPI in UDM/UDR may make it more convenient for other network functions and AF to retrieve the PSPI as a part of UE context.

Eighth, information may be with regard to policy on how to manage PSPI. Indicate whether UE or SMF is responsible for generating and updating the PSPI. PCF may include above information in a PCC rule or in PDU Session related policy information and provide to SMF. AF may also input some application related information to network (e.g., PCF) to affect the redundant PDU session policy/parameter provisioning. For example, AF may directly request redundant transmission for certain type of application traffic, for (a group of) UEs within some location, within a time period, or when UE is moving. AF may indicate to PCF that redundant transmission is preferred or required for a certain application (e.g., identified by application ID, IP address of the application server) associated with a class of QoS requirement (e.g., 5QI, Maximum Packet Loss Rate, Packet Delay Budget) and the corresponding Redundant User Plane Requirements. One option to do this is to enhance the procedure of AF influence on traffic routing, where AF provides information to PCF via NEF. The information from AF could help PCF generate the PCC rule related to redundant transmission, which is sent to SMF.

When SMF receives the PDU session establishment/modification request, SMF decides whether the redundant transmission is required based on the policy rules and information provided by PCF. SMF will then select the UPF that supports the redundant transmission. In particular, SMF may consider the following information for UPF selection related to the redundant transmission: First, whether a UPF is able to perform traffic duplication/elimination to support N3/N9 based redundant transmission Second, whether a UPF has capability of supporting RSN for the DC based redundant transmission Note that PCF provides the policy and parameters to SMF to manage the redundant transmission in a static manner, e.g., these policies or parameters won't be changed or updated frequently. While SMF may consult with other network functions such as UDM/UDR 209, AMF 203, UPF 206, and NWDAF for the network condition, UE's subscription data and user plane performance in real time when deciding whether redundant transmission is needed or what level of redundant user plane requirement is needed.

Method of PDU Session Pair Information (PSPI) Provisioning

As discussed herein, RSN does not indicate which 2 PDU sessions are linked together for DC based redundant transmission. This PDU session pair information may be important to RAN node to establish dual connectivity to enable the redundant transmission. Disclosed herein is subject matter with regard to how to construct PSPI, what information is included in the PSPI and how to provide PSPI to the RAN node (e.g., Master RAN 202).

For DC based redundant transmission, each PDU session may be established by a different SMF respectively. This implies that these two SMFs may be not aware of each other, therefore UE 201 may be the first entity with knowledge of which the at least one PDU sessions are linked together before any other network functions. It is disclosed that UE 201 generates the PSPI and provides it to SMF 204, which further sends the PSPI to the RAN nodes via N2 SM message.

Figure 6:
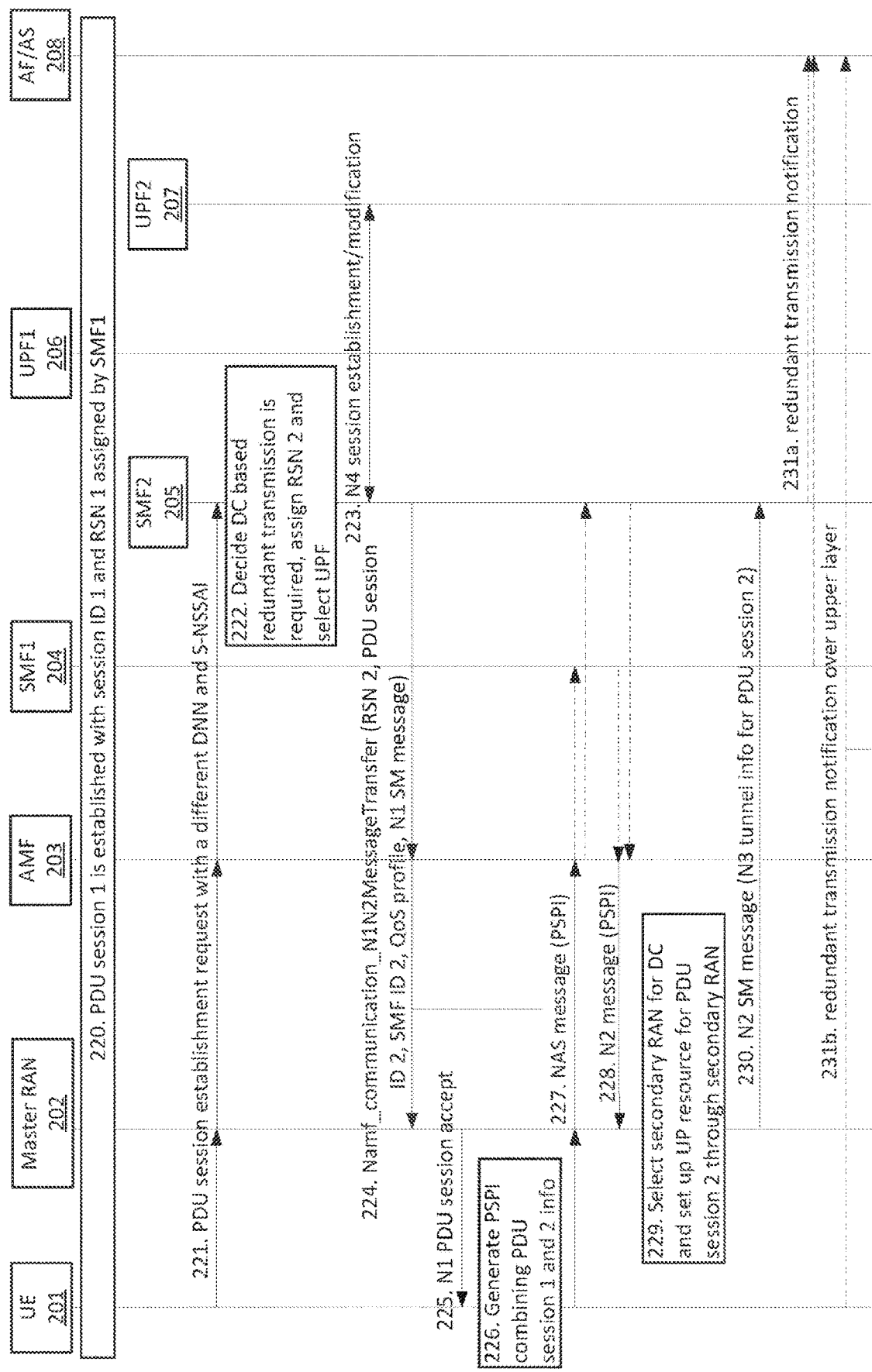
FIG. 6 illustrates an exemplary procedure of PSPI generation and provisioning.

FIG. 6 illustrates an exemplary procedure of PSPI generation and provisioning to RAN node. Note that it is assumed that different SMFs (e.g., at least two) are selected to manage the different PDU sessions respectively for general purpose.

Step 220: PDU session 1 is established by SMF 204, which determines that redundant transmission is required. Therefore, SMF 204 assigns RSN 1 with PDU session 1. At this time, RAN node knows dual connectivity is required to support the redundant transmission, however, since there is only 1 PDU session information, RAN node will wait for another PDU session information or PSPI to build the dual connectivity.

Step 221: the upper layer of UE 201 sends request to NAS layer to establish another PDU session for the same application. However, a different combination of DNN and S-NSSAI is provided. The UE 201 sends the PDU session establishment request to AMF 203 via the RAN node including PDU session ID 2 and a different combination of DNN and S-NSSAI. This implies that at least DNN or S-NSSAI is different from that used for PDU session 1 (however they may be the same). The AMF 203 selects SMF 205 to manage the session establishment. UE 201 may explicitly indicate that redundant transmission is required for the given DNN and S-NSSAIs in the request.

Step 222: based on policy and parameters provided by PCF and local policy configuration by operator, SMF 205 determines redundant transmission is required, so it assigns RSN 2 to the PDU session ID 2. Then SMF 205 selects UPF 207 as anchor point for PDU session 2. Note that SMF 205 may contact UDM/UDR 209 to retrieve subscription data of UE 201 to verify whether UE 201 is allowed to have redundant transmission. In addition, SMF 205 may contact PCF to retrieve some policy related to redundant transmission if it does not have enough information to make the decision or to generate the RSN.

Step 223: SMF 205 sends N4 session establishment or modification request message to the UPF 207.

Step 224: SMF 205 then sends N2 SM message to the RAN node. The N2 SM message includes the PDU session ID 2, QoS profile, RSN 2, and SMF 205 service area. The master RAN node 202 knows that PDU session 2 needs to be handled redundantly with dual connectivity since an RSN is associated. However, at this stage, the RAN node does not know which session is associated with the PDU session 2 for the redundant transmission even if RAN node knows context information of PDU session 1 during the PDU session establishment (i.e., step 220). NAS SM accept message is also included and will be forwarded to UE 201.

Step 225: NAS SM accept message is forwarded to UE 201 with RSN 2.

Step 226: The UE 201 generates PSPI information. Specifically, based on existing DC based redundant transmission mechanism, upper layer of UE 201 handles the traffic duplication/elimination, so it knows that PDU session 1 and 2 are linked together to provide the redundant transmission for the same application traffic. The upper layer of UE 201 constructs the PSPI and sends it to the NAS layer. The UE 201 associates the PSPI with the 2 PDU session IDs, which were generated by UE 201 when it requested to establish the PDU sessions. In DC, both RAN nodes in DC will communicate with 2 SMFs via a single N2 interface. Providing SMF ID can help RAN node to contact SMF for session management signaling, such as QoS notification.

Alternatively, PSPI could be a number or an ID (e.g., PDU session pair ID) that is assigned by the UE 201. The UE 201 may provide the same PSPI to the network for PDU Sessions that are redundant. In this option, PSPI stored in UDM/UDR 209 is used as a reference to the PDU session IDs that are linked together for the redundant transmission.

Step 227: UE 201 sends the PSPI information to AMF 203 via NAS message. Then AMF 203 can send the PSPI to UDM/UDR 209 where the PSPI is stored as a part of UE context. Storing the PSPI in UDM/UDR 209 will make it easier for other network entities to retrieve PSPI of a UE 201 especially when 2 different SMFs manage the 2 sessions respectively. In addition, AMF 203 may send PSPI to SMF 204 or SMF 205 based on policy configuration by operator. In this case, SMF may contact UDR/UDM to store the PSPI as UE context.

Step 228: AMF 203 or SMF sends PSPI to the RAN node using N2 message.

Step 229: with PSPI, the RAN node starts working as the master RAN node 202 and selects the secondary RAN node partially based on PSPI to establish dual connectivity for PDU session 2. Note that how to select the secondary RAN node and build dual connectivity is out of scope of this paper.

Step 230: master RAN node 202 sends N2 SM message to SMF 205 through AMF 203, which includes the N3 tunnel information for transferring user plane data between the secondary RAN node and the UPF 207.

Step 231: optionally, if AF 208 or application server subscribes to get notification when redundant transmission is enabled for its traffic, SMF 204 or SMF 205 may send the notification. AF 208 can send the subscription request to PCF/SMF through the procedure of AF 208 influence on traffic routing. Alternatively, UE 201 may send the notification to AF/AS 208 by using the application layer signal. The notification includes the PSPI.

In FIG. 6, the UE 201 generates PSPI after PDU session 2 is established. Thus, the network is not initially aware that the PDU Sessions are linked. The UE 201 may later determine to send a NAS message (e.g., a PDU Session Modification Message) for each of the 2 PDU Sessions. The UE 201 may determine to send the NAS message based on a request for redundant transmission from application layer (for example, the indication from application layer that redundant PDU sessions are required may come to ME from the TE via an AT Command). The PDU Session Modification Messages include the same PSI. Each SMF then forwards the PSI to the RAN node in an N2 Message (via the AMF 203). In this way, the RAN node learns which 2 PDU Sessions are linked.

It is also possible that UE 201 generates and provides PSPI to network in PDU session establishment request for each PDU Session. In this scenario, at the beginning, UE 201 decides that redundant transmission is needed based on request for redundant transmission from application layer (for example, the indication from application layer that redundant PDU sessions are required may come to ME from the TE via an AT Command), so UE 201 generates 2 PDU session IDs and a PSPI. Specifically, the NAS layer of UE 201 generates PSPI in this case. UE 201 then sends PDU session establishment requests to network including the 2 PDU session IDs, 2 sets of combination of DNN and S-NSSAI, PSPI linking the 2 PDU session IDs and an indication that redundancy is required. Thus, the network is initially aware that the PDU Sessions are linked. The PDU Session Modification Messages include the same PSI. Each SMF then forwards the PSI to the RAN node in an N2 Message (via the AMF 203). In this way, the RAN node learns which 2 PDU Sessions are linked at PDU Session Establishment.

Alternatively, the UE 201 may provide only 2 PDU session IDs and the indication that redundancy is required. The Network (e.g., SMF or AMF 203) may generate the PSPI upon receiving the PDU session establishment request from UE 201 with the above information. The AMF 203 may still select 2 different SMFs to manage the respective PDU session in this scenario. In another scenario, the UE 201 may send the PSPI and redundant transmission indication during the second PDU session establishment request.

Procedure of PDU Session Modification for Redundant Transmission

Disclosed herein are procedures of managing PSPI and related information when redundant transmission is disabled because one of the PDU sessions needs to be modified or released. Specifically, there are multiple possible cases, such as shown below: 1) Network, UE or AF decides to disable the redundant transmission by releasing or deactivating one of the PDU sessions; or 2) Network, UE or AF decides to modify the redundant PDU session pair (e.g., release/deactivate one and link the remaining one with another PDU session), which incurs update of PDU session pair information (PSPI) consequently.

Figure 7A:
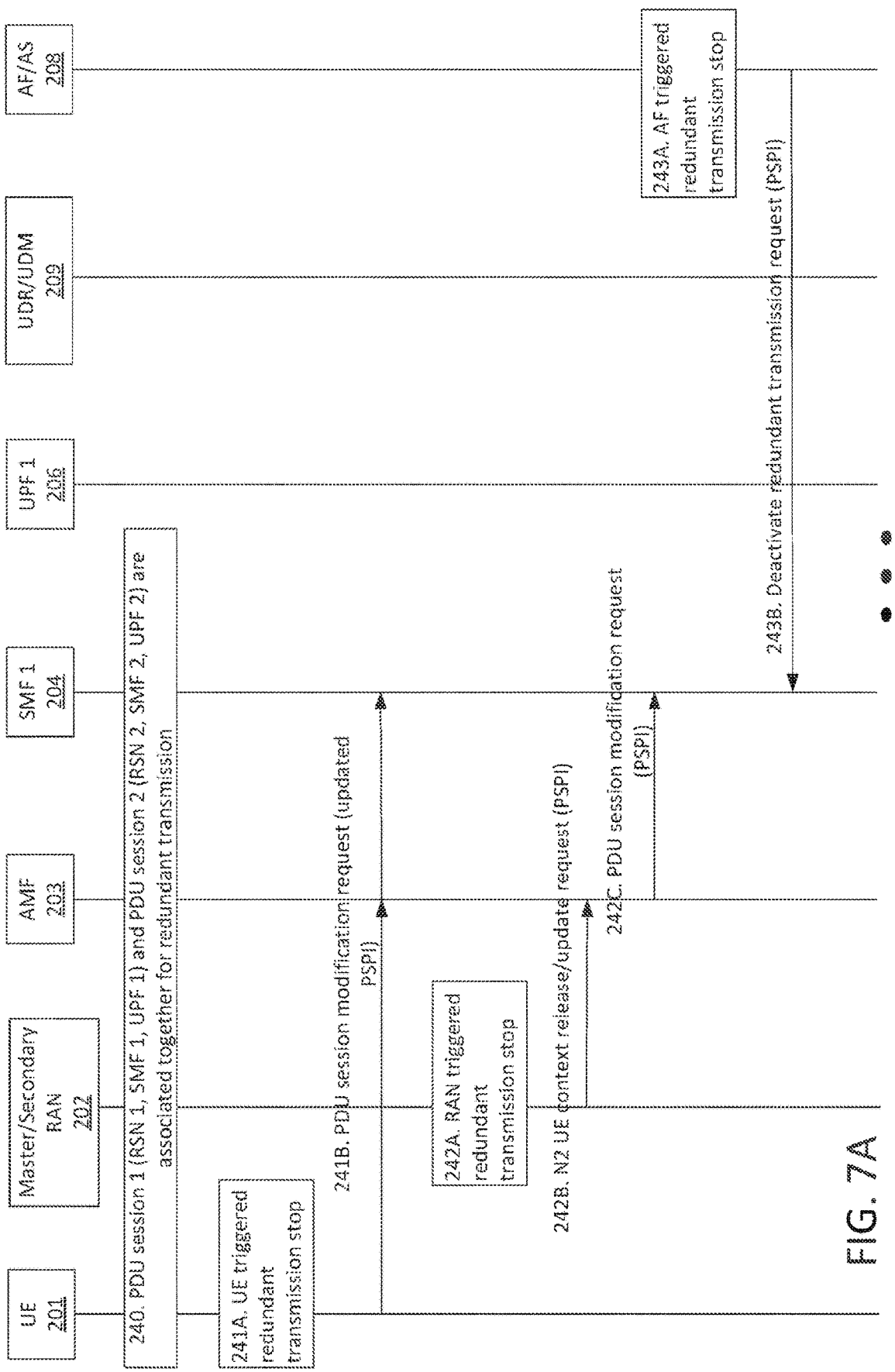
FIG. 7A and FIG. 7B illustrate exemplary procedures of updating PSPI due to PDU session modification/release.
Figure 7B:
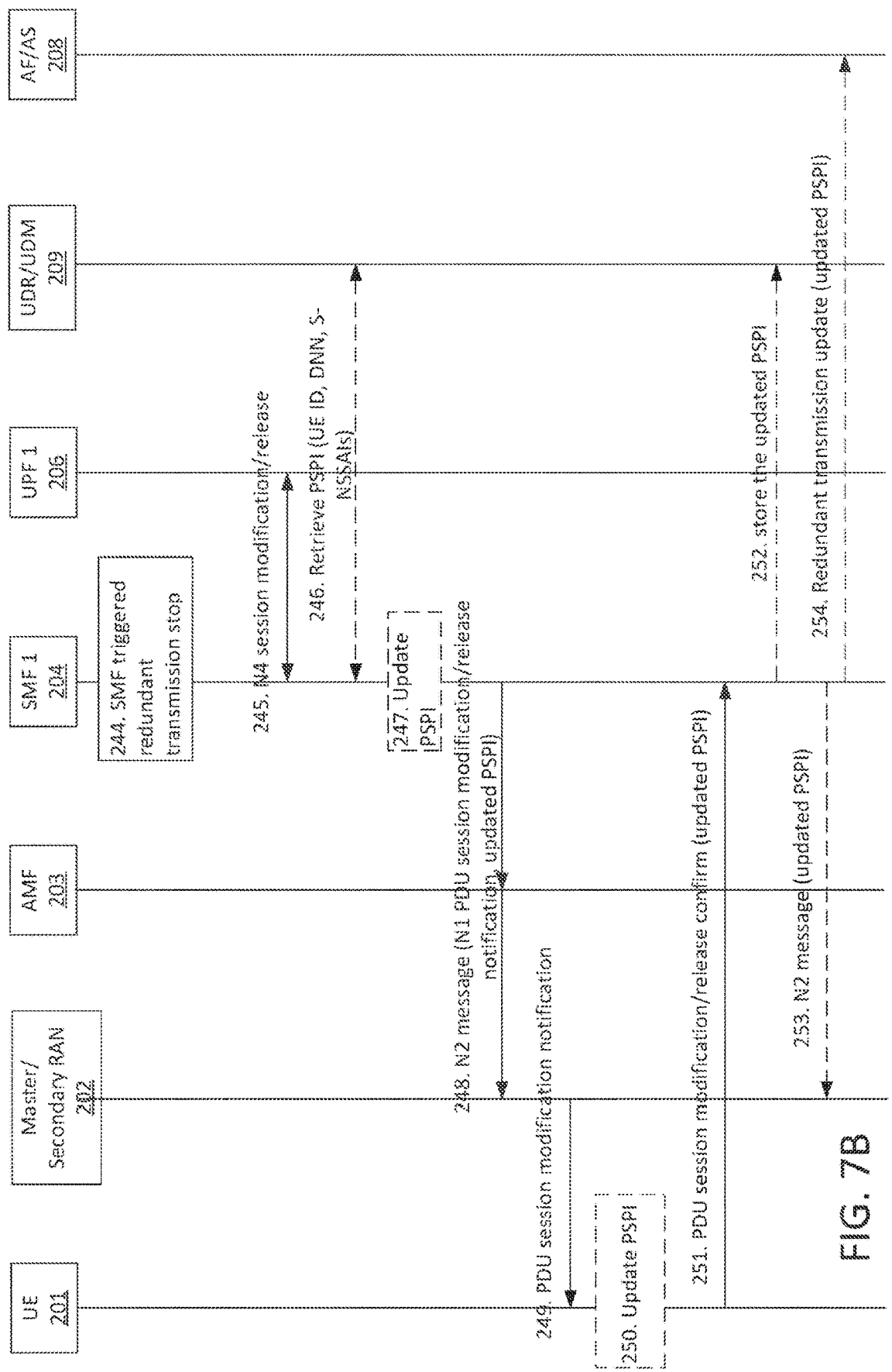

FIG. 7A-FIG. 7B shows a procedure of updating PSPI triggered by PDU session modification or release.

Step 240: 2 PDU sessions are established for redundant transmission. Note that different SMFs and UPFs are used although the SMF 205 and UPF 207 are not shown in the figure. PDU session 1 is used as the example for illustration.

There are multiple possible scenarios (four shown below) to trigger the procedure of disable/update of the redundant transmission:

Case 1: UE 201 Triggers the Process.
  Step 241A: UE 201 may trigger the process based on request from application layer. For example, the application traffic terminates, or the application traffic does not require redundancy anymore. Moreover, UE 201 may trigger the process due to network conditions, e.g., UE 201 wants to modify PDU session 1, or release PDU session 1 and then associate PDU session 2 with another session for the redundant transmission. This may be because UE 201 is moving out of SMF 204 service area, or PDU session 1 does not meet the requirement of the application traffic.
  Step 241B: as a result, UE 201 sends the PDU session modification or release request message to SMF 204. UE 201 provides the PSPI, PDU session 1 ID and the combination of DNN and S-NSSAIs. UE 201 may provide an indication to indicate whether it wants to stop the redundant transmission or continue the redundant transmission by modifying the PDU session 1 or by replacing PDU session 1 with another session for the redundant transmission. Note that if UE 201 wants to link PDU session 2 with another PDU session, PSPI will be updated by UE 201 which links PDU session 2 and another PDU session together. If it is a new PDU session, UE 201 will generate and provide the new PDU session ID, and request session establishment process accordingly.

Case 2: RAN Node Triggers the Process.
  Step 242A: Although RAN node cannot directly decide to stop or disable the redundant transmission, RAN node may trigger the PDU session modification process, which consequently triggers the stop redundant transmission. For example, handover is needed for the UE, QoS of PDU session 1 is not satisfactory, or radio link failure. In those cases, RAN will trigger the PDU session modification process to update the redundant transmission operation, which further trigger the PSPI update. Note that RAN node will not generate or update PSPI. UE 201 or SMF may perform PSPI generation or update.
  Step 242B: master RAN node 202 sends N2 SM message to SMF 204 to request the modification of PDU session 1. The message includes the PDU session 1 ID, PSPI and cause of the PDU session modification request. The cause of the PDU session modification can help SMF determine whether to stop the redundant transmission or continue redundant transmission by modifying PDU session 1 or by replacing PDU session 1 with another PDU session.
  Step 242C: AMF 203 forwards the PDU session modification message to SMF 204.

Case 3: AF 208 or Application Server Triggers the Process.
  Step 243A: AF 208 may trigger the process due to several possible events. For example, the AF 208 terminates the application traffic that requires the redundant transmission, application traffic has lowered the QoS requirement so redundant transmission is not needed.
  Step 243B: AF 208 sends request to PCF, which notifies SMF to deactivate or stop the redundant transmission, which includes PSPI, PDU session ID, UE ID, DNN and the cause of the request. The cause will help SMF to determine how to deal with PDU session 1, i.e., release or modify the PDU session. In addition, 5GC may be trigger an application to start in UE 201 and indicate redundant transmission is required based on the request from AF 208 or application server, and the UE 201 will then trigger the redundant transmission for the application traffic by requesting to establish a PDU session to a specific DNN with S-NSSAIs.

Case 4: Network Functions (e.g., SMF) Triggers the Process.
  Step 244: network functions such as SMF 204 may also trigger the process to stop the redundant transmission or update redundant transmission configuration. This may be due to several events, such as out of SMF service area due to UE mobility, user plane congestion in PDU session. In addition, NWDAF may provide network performance statistic to network functions, which is used as input to decide whether to trigger the process.
  Step 245: SMF 204 sends N4 session modification or release request to UPF 206 depending on whether SMF decides to modify PDU session 1 or release the session.
  Step 246: in case SMF does not receive PSPI in previous steps, i.e., UE, RAN node or AF 208 does not provide PSPI, while PSPI needs update since PDU session 1 will be released or replaced to support the redundant transmission, SMF will retrieve PSPI from UDR/UDM as UE context assuming PSPI is stored there.
  Step 247: if SMF is responsible for generating and updating PSPI, SMF will update the PSPI. For example, if redundant transmission is stop/disabled, SMF may delete PSPI. If PDU session 1 is replaced by another session for continuing the redundant transmission, SMF may update the PDU session ID that are linked together in PSPI. If UE 201 is responsible for managing PSPI, this step will be skipped.
  Step 248: SMF sends N2 SM message to master RAN node 202 via AMF 203, with PDU session 1 modification/release notification and an indication whether redundant transmission is disabled or not. If redundant transmission is going to continue with another PDU session replacing PDU session 1, SMF will provide the new PSPI linking the new PDU session and PDU session 2. Within the N2 message, SMF also encapsulates an NAS message that is destined to UE. The NAS message could be PDU session modification notification or response depending on which entity triggers the process at the beginning. The NAS message may include the updated PSPI if SMF updates the PSPI.
  Step 249: master RAN node 202 forwards the NAS message to UE, which includes the modified PDU session information. In case that SMF manages PSPI, the NAS message further includes the updated PSPI, or an indication about whether redundant transmission has been disabled. In case that SMF decides to replace PDU session 1 with another PDU session to continue the redundant transmission, SMF will provide session context information in the NAS message as well, such as PSU session ID, QoS rules and other session context information.

Step 250: In case UE 201 is responsible for managing and updating PSPI, UE 201 will update or delete PSPI based on session modification information provided by SMF. Specifically, if redundant transmission stops, UE 201 will delete the PSPI. If redundant transmission continues, while PDU session 1 is replaced by another session, UE 201 will update PSPI by linking the new PDU session with PDU session 2.

Step 251: UE 201 sends the updated PSPI or PSPI delete notification to SMF via NAS message if UE 201 is responsible to manage the PSPI.

Step 252: SMF optionally sends the updated PSPI to UDR/UDM for storage as a part of UE context.

Step 253: SMF sends the PSPI update or delete notification to master RAN node 202 so that RAN node is able to adjust user plane resource within the radio network. The master RAN node 202 may even replace the secondary RAN node with another RAN node.

Step 254: SMF sends the PSPI update or delete notification to AF. This is optional and depends on whether AF 208 subscribes to the PSPI update or delete, or configuration by PCF.

URSP Enhancement to Enable UL Traffic Duplication at PDU Layer

Herein, it was described that the UE 201 may decide to provide a PSPI based on a request from the Application layer (e.g. based on an AT Command). Alternatively, the UE 201 may be configured to detect when certain Application Layer Traffic should be duplicated onto multiple PDU Sessions and the UE 201 may perform the traffic duplication in the PDU layer. When the UE 201 detects that certain Application Layer Traffic should be duplicated onto multiple PDU Sessions, the UE 201 may use the procedures that were described earlier to establish redundant PDU Session.

In a first example of how the UE 201 may detect that certain Application Layer Traffic should be duplicated onto multiple PDU Sessions, the UE 201 may be configured with URSP Rules that include an indication that traffic associated with the URSP rule should be duplicated on multiple PDU Sessions. In this example, the URSP Rule may indicate whether DC based or N3/N9 duplication is required. If DC based duplication is required, then the UE 201 may establish 2 PDU sessions as described above, and, in the PDU layer, duplicate the application traffic onto the multiple PDU sessions.

The UE 201 may use the RSDs that are associated with the URSP rule to establish 2 PDU Sessions for the associated traffic. The UE 201 may use the highest priority RSDs to attempt to establish the redundant PDU Sessions until 2 PDU Sessions can be established. Alternatively, the URSP rule may include multiple sets of RSDs (one for each PDU Session). The UE 201 may behave such if the UE 201 can only establish 1 PDU Session and not a second PDU session, the UE 201 will proceed with only 1 PDU Session. Alternatively, the UE 201 may behave such that it will terminate the first PDU Session and indicate to the application that PDU Session establishment was unsuccessful (or try lower precedence URSP rules) if establishment of only 1 PDU Session was successful. Whether the UE 201 proceeds with only one PDU Session or multiple PDU Sessions may be based on UE 201 implementation or based on an indication in the URSP rule.

If the URSP rule indicates that N3/N9 duplication is required, then the UE 201 may indicate to the SMF that N3/N9 duplication is required for the PDU Session. Specifically, it is disclosed to add 2 new parameters in the traffic descriptor of a URSP rule:

First parameter, a redundant transmission indicator: This indicator indicates whether redundant transmission is needed for the traffic. When this indication is included, an indicational indication may be used to indicate whether the traffic may be sent over 1 PDU Session if only one PDU Session is successfully established.

Second parameter, an N3/N9 Redundancy Indicator: This indicator indicates whether DC based, N3/N9 tunnel based or transport layer redundant transmission is needed.

These 2 attributes, or indicators, in the URSP rule can help the UE 201 to decide that redundant transmission is required for the specific traffic, and to include the indication in the PDU session establishment request message.

Alternatively, the above attributes could be added to the route selection descriptor so that UE 201 knows that the UE 201 needs to duplicate the traffic identified by a combination of DNN and S-NSSAI described in RSD.

The configuration of these indications in URSP may come from PCF, which gets the information from AF 208 or application server indicating that redundant transmission is needed for an application traffic identified by DNN and/or IP address of the AS.

In another example, the UE 201 may indicate to the SMF that the UE 201 is capable of supporting DC based duplication. This indication may be sent to the SMF during PDU Session Establishment. The SMF may indicate to the UE, in the PDU Session Establishment Accept, that DC based duplication should be applied. The UE 201 may then establish a redundant PDU Session as described earlier. As described earlier, traffic duplication may be performed by the UE 201 for the UL traffic in the PDU layer, and duplication elimination may be performed for DL traffic in the PDU layer.

Figure 8:
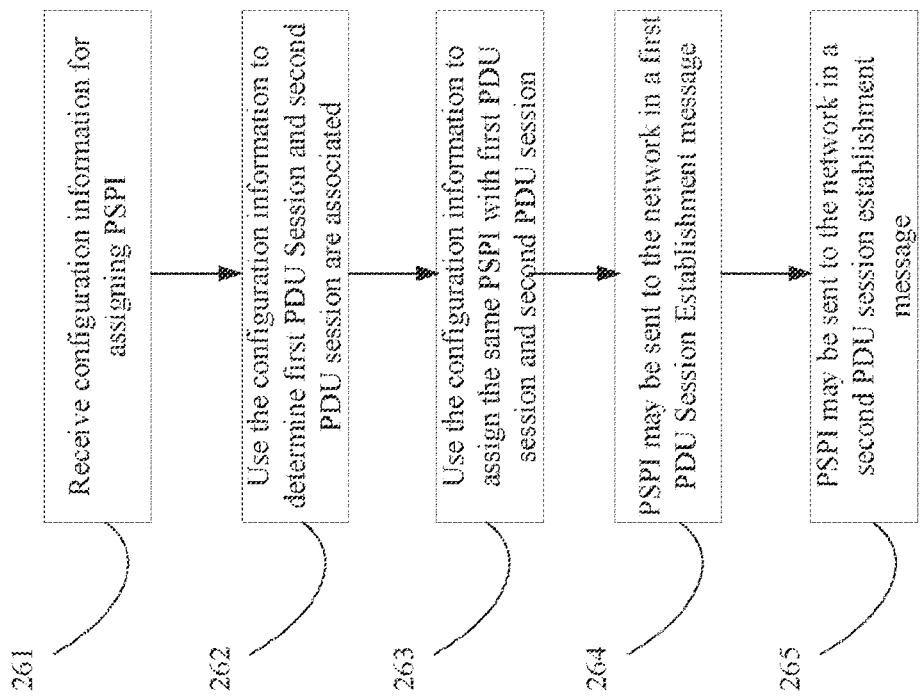
FIG. 8 illustrates an exemplary procedure for redundant transmission in 5G network.

FIG. 8 illustrates an exemplary procedure for redundant transmission in 5G network. At step 261, UE 201 may receive configuration information for assigning PDU session pair information (PSPI) to PDU sessions, in which the PSPI may be a number. The configuration information may be received in a URSP rule or AT command. The upper layer may determine the PSPI and provides it to the UE 201 via an AT Command. The URSP rule includes a redundant transmission indicator. The redundant transmission indicator may be part of a route selection descriptor (RSD) in the URSP rule.

At step 262, the configuration information may be used to determine that a first PDU session and a second PDU session are associated. PDU Sessions may be considered to be associated if both PDU Sessions are used to send data from the same application (e.g. if an application sends the same data over both PDU Sessions in order to achieve redundancy) or if both PDU Sessions are used to receive data for the same application (e.g. if the same application data is received via both PDU Sessions (e.g., the application data is duplicated in order to achieve redundancy)).

At step 263, the configuration information may be used to determine to assign the same PSPI (e.g., a first PSPI) with a first PDU session and a second PDU session.

At step 264, the PSPI may be sent to the network (e.g., SMF 204) in a first PDU session establishment message to establish the first PDU session.

At step 265, the PSPI may be sent to the network in a second PDU session establishment message to establish the second PDU session. The first PDU session or the second PDU session may be associated with redundant transmissions or more particularly dual connectivity redundant transmissions. The first PDU session or second PDU session may be associated with one or more different combinations of DNN or S-NSSAI. The first PDU session establishment message or second PDU session establishment message may each include an indication that redundancy is required.

Figure 9:
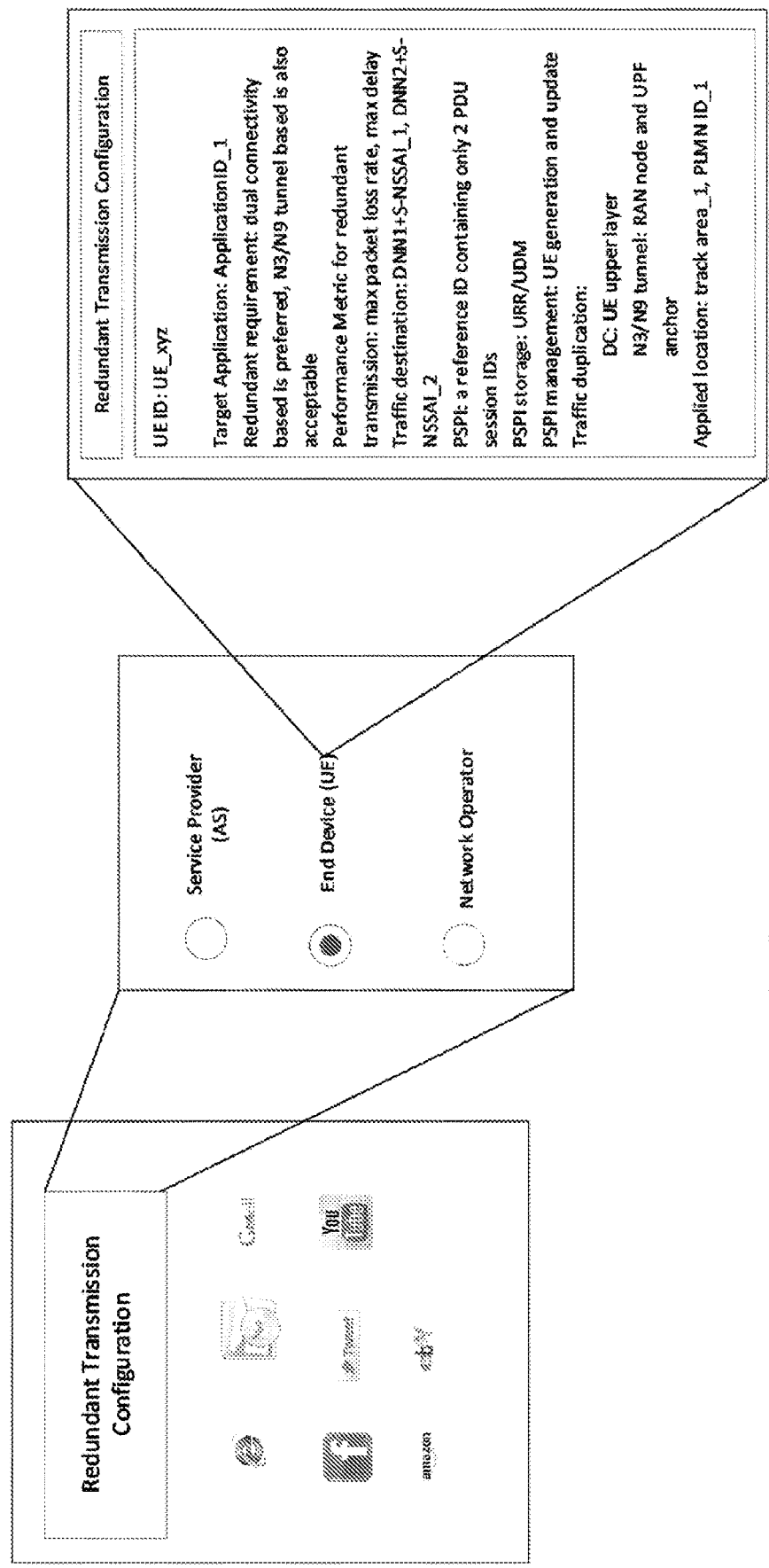
FIG. 9 illustrates an exemplary user interface to configure redundant transmission in which a display may be generated based on the methods, systems, and devices of redundant transmission in a wireless network.

The parameters involved in redundant transmission operation could be provisioned by the end user (e.g., UE 201), network operator, or application service provider through a user interface. The user interface may be implemented for configuring or programming those parameters with default values, as well as enabling or disabling the redundant transmission. An exemplary user interface is shown in FIG. 9. Progress of any of the steps (e.g., sent messages or success of steps) discussed herein may be displayed. In addition, graphical output may be displayed on display interface of FIG. 9. Graphical output may be the topology of the devices implementing the methods, systems, and devices of redundant transmission in a wireless network, a graphical output of the progress of any method or systems discussed herein, or the like.

It is understood that the entities performing the steps illustrated herein, such as FIG. 7-FIG. 9, may be logical entities. The steps may be stored in a memory of, and executing on a processor of, a device, server, or computer system such as those illustrated in FIG. 10F or FIG. 10G. Skipping steps, combining steps, or adding steps between exemplary methods disclosed herein (e.g., FIG. 7-FIG. 9) is contemplated.

Table 1 or Table 2 are Definitions or abbreviations of subject matter disclosed herein.

TABLE 1

| | Definitions |
|---|---|
| Network Function (NF) (TS 23.501) | A NF is a processing function in a network, which has defined functional behavior and defined interfaces. A NF can be implemented as a network element on a dedicated hardware, or as a software instance running on a dedicated hardware, or as a virtualized function instantiated on an appropriate platform, e.g. on a cloud infrastructure. |
| Always-on PDU Session (TS 23.501) | A PDU Session for which User Plane resources have to be activated during every transition from CM-IDLE mode to CM-CONNECTED state. Based on an indication from upper layers, a UE may request to establish a PDU Session as an always-on PDU Session. The SMF decides whether the PDU Session can be established as an always-on PDU Session. |
| Redundant PDU Sessions | PDU session that is involved to support redundant transmission for an URLLC application. It could be dual connectivity based or N3/N9 tunnel based redundant transmission. |
| PDU Session pair information (PSPI) for the redundant PDU Sessions | The information that indicates which 2 PDU sessions are working together to provide redundant transmission via dual connectivity |

TABLE 2

Abbreviations and Definitions

| Abbreviations | Definitions |
|---|---|
| 5GC | 5G Core Network |
| AF | Application Function |
| AMF | Access and Mobility Management Function |
| API | Application Program Interface |
| AS | Application Server |

TABLE 2-continued

Abbreviations and Definitions

| Abbreviations | Definitions |
|---|---|
| CM | Connection Management |
| CN | Core Network |
| CP | Control Plane |
| DC | Dual Connectivity |
| DL | Downlink |
| EPS | Evolved Packet System |
| GUTI | Globally Unique Temporary UE Identity |
| IE | Information Element |
| IMSI | International Mobile Subscriber Identity |
| MM | Mobility Management |
| NAS | Non-Access Stratum |
| NF | Network Function |
| NSI | Network Slice Instance |
| NWDAF | Network Data Analytics Function |
| PCF | Policy Control Function |
| PDU | Packet Data Unit |
| PSA | PDU Session Anchor |
| PSPI | PDU Session Pair Information |
| QoS | Quality of Service |
| NG-RAN | Next Generation Radio Access Network |
| RAT | Radio Access Technology |
| RM | Registration Management |
| RSD | Route Selection Descriptor |
| RSN | Redundancy Sequence Number |
| PSPI | PDU session pair information |
| SSC | Session and Service Continuity |
| SM | Session Management |
| SMF | Session Management Function |
| S-NSSAI | Single Network Slice Selection Assistance Information |
| UE | User Equipment |
| UL | Uplink |
| UP | User Plane |
| URLLC | Ultra-Reliable Low Latency Communication |
| URSP | UE Route Selection Policy |

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to include a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 10A:
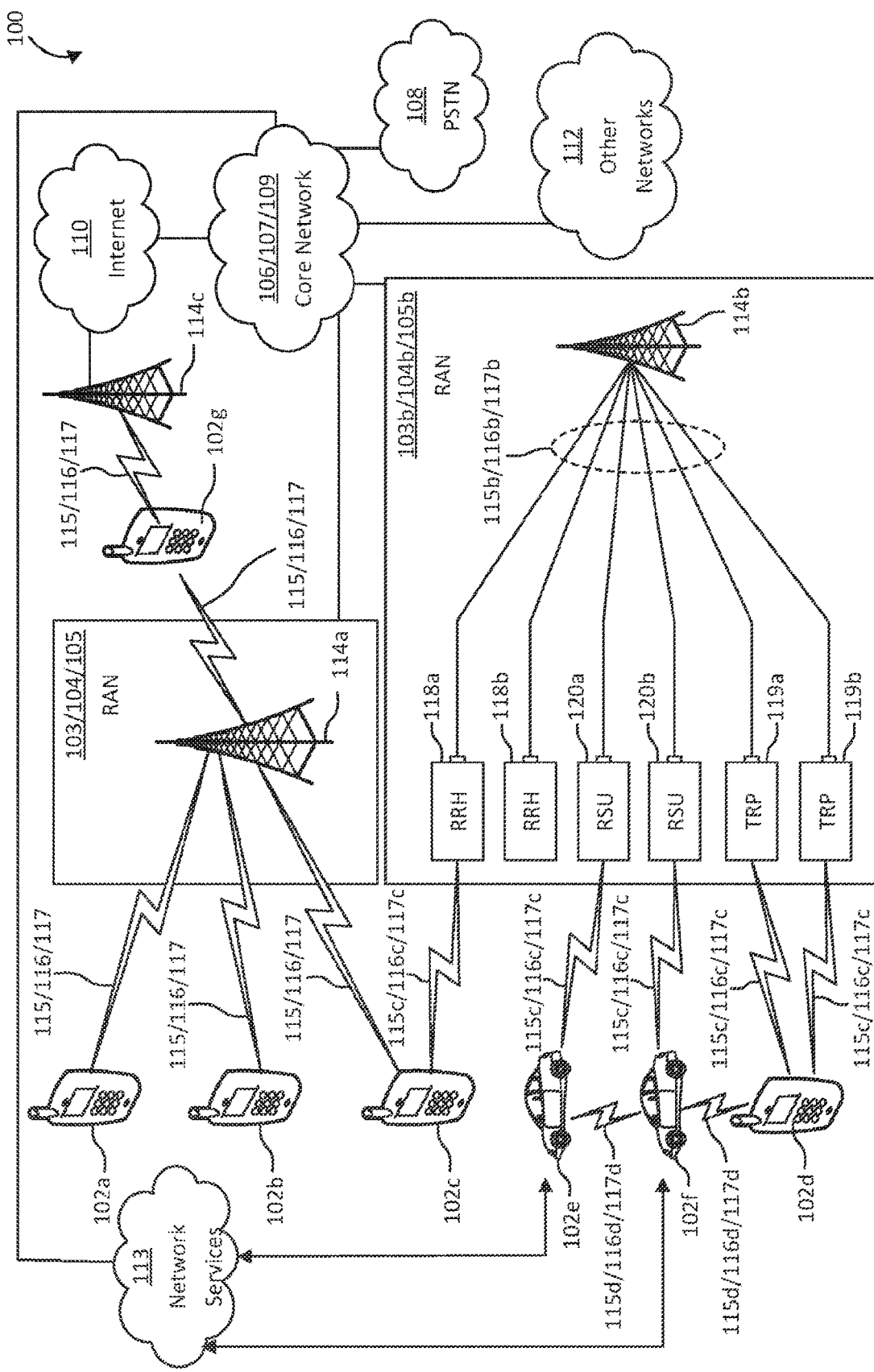
FIG. 10A illustrates an example communications system.

FIG. 10A illustrates an example communications system 100 in which the methods and apparatuses of redundant transmission in a wireless network (e.g., 5G), such as the systems and methods illustrated in FIG. 1 through FIG. 7 described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 10A, FIG. 10B, FIG. 10C, FIG. 10D, FIG. 10E, or FIG. 10F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 10A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of redundant transmission in a wireless network, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b*, TRPs 119*a*, 119*b* or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

The WTRUs 102*a*, 102*b*, 102*c*,102*d*, 102*e*, or 102*f* may communicate with one another over an air interface 115*d*/116*d*/117*d*, such as Sidelink communication, which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*,TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114*a* and the WTRUs 102*a*, 102*b*, 102*c*, or RRHs 118*a*, 118*b*, TRPs 119*a*, 119*b*, or RSUs 120*a*, 120*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) or LTE-Advanced (LTE-A). In the future, the air interface 115/116/117 or 115*c*/116*c*/117*c* may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114*a* in the RAN 103/104/105 and the WTRUs 102*a*, 102*b*, 102*c*, and 102*g* or RRHs 118*a*, 118*b*, TRPs 119*a*, 119*b* or RSUs 120*a*, 120*b* in the RAN 103*b*/104*b*/105*b* and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 10A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of redundant transmission in a wireless network, as disclosed herein. In an example, the base station 114*c* and the WTRUs 102, e.g., WTRU 102*e*, may implement a radio technology such as IEEE 802.11 to establish a wireless local area network (WLAN), similarly, the base station 114*c* and the WTRUs 102*d*, may implement a radio technology such as IEEE 802.15 to establish a wireless personal area network (WPAN). In yet another example, the base station 114*c* and the WTRUs 102, e.g., WTRU 102*e*, may utilize a cellular-based RAT (e.g., WCDMA, CDMA2000, GSM, LTE, LTE-A, NR, etc.) to establish a picocell or femtocell. As shown in FIG. 10A, the base station 114*c* may have a direct connection to the Internet 110. Thus, the base station 114*c* may not be required to access the Internet 110 via the core network 106/107/109.

The RAN 103/104/105 or RAN 103*b*/104*b*/105*b* may be in communication with the core network 106/107/109, which may be any type of network configured to provide voice, data, messaging, authorization and authentication, applications, or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 10A, it will be appreciated that the RAN 103/104/105 or RAN 103*b*/104*b*/105*b* or the core network 106/107/109 may be in direct or indirect communication with other RANs that employ the same RAT as the RAN 103/104/105 or RAN 103*b*/104*b*/105*b* or a different RAT. For example, in addition to being connected to the RAN 103/104/105 or RAN 103*b*/104*b*/105*b*, which may be utilizing an E-UTRA radio technology, the core network 106/107/109 may also be in communication with another RAN (not shown) employing a GSM or NR radio technology.

The core network 106/107/109 may also serve as a gateway for the WTRUs 102*a*, 102*b*, 102*c*, 102*d*, 102*e* to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103*b*/104*b*/105*b* or a different RAT.

Some or all of the WTRUs 102*a*, 102*b*, 102*c*, 102*d*, 102*e*, and 102*f* in the communications system 100 may include multi-mode capabilities, e.g., the WTRUs 102*a*, 102*b*, 102*c*, 102*d*, 102*e*, and 102*f* may include multiple transceivers for communicating with different wireless networks over different wireless links for implementing methods, systems, and devices of redundant transmission in a wireless network, as disclosed herein. For example, the WTRU 102*g* shown in FIG. 10A may be configured to communicate with the base station 114*a*, which may employ a cellular-based radio technology, and with the base station 114*c*, which may employ an IEEE 802 radio technology.

Although not shown in FIG. 10A, it will be appreciated that a User Equipment may make a wired connection to a gateway. The gateway maybe a Residential Gateway (RG). The RG may provide connectivity to a Core Network 106/107/109. It will be appreciated that much of the subject matter included herein may equally apply to UEs that are WTRUs and UEs that use a wired connection to connect with a network. For example, the subject matter that applies to the wireless interfaces 115, 116, 117 and 115c/116c/117c may equally apply to a wired connection.

Figure 10B:
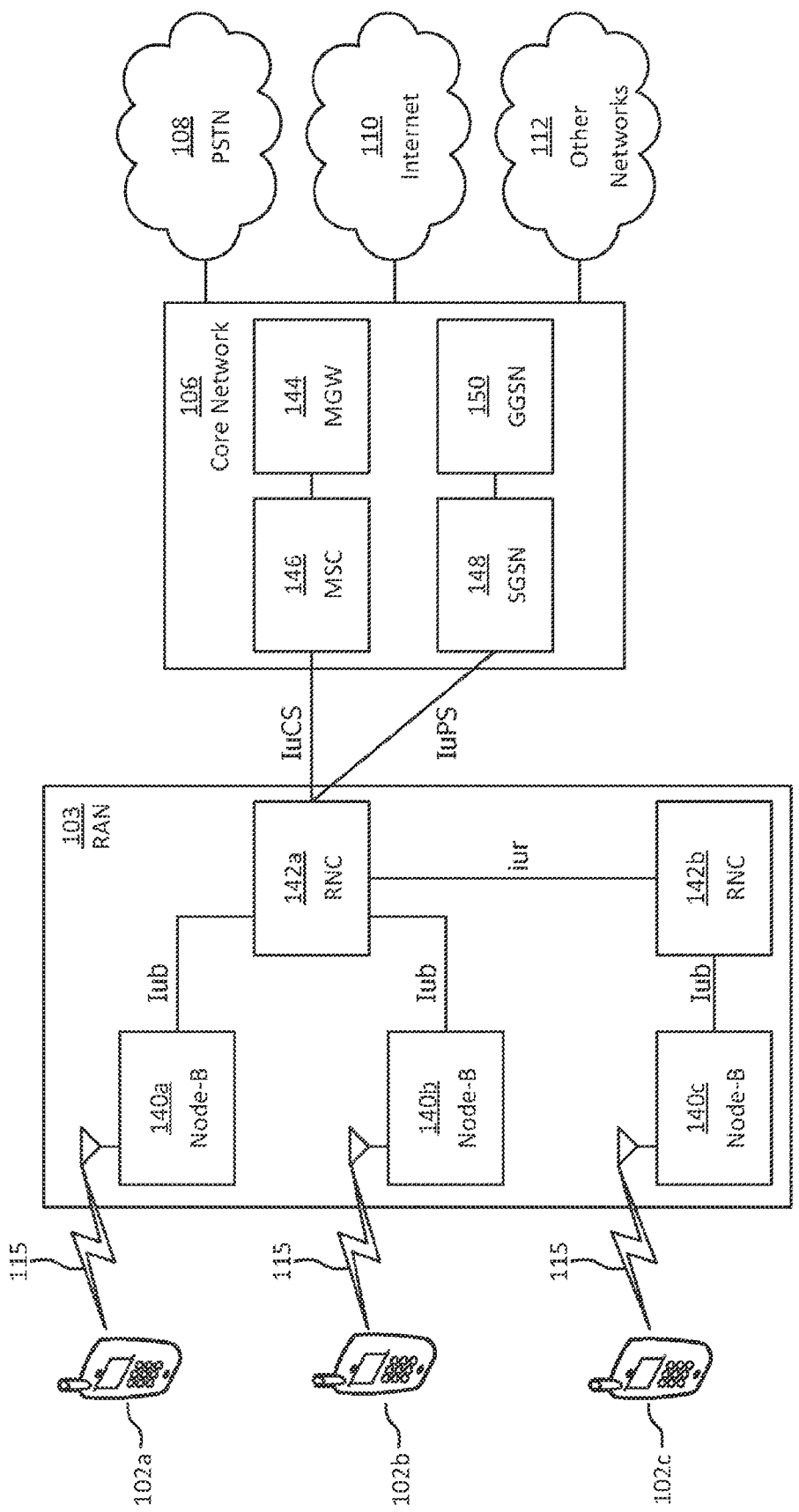
FIG. 10B illustrates an exemplary system that includes RANs and core networks.

FIG. 10B is a system diagram of an example RAN 103 and core network 106 that may implement methods, systems, and devices of redundant transmission in a wireless network, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 10B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 10B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 10B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 10C:
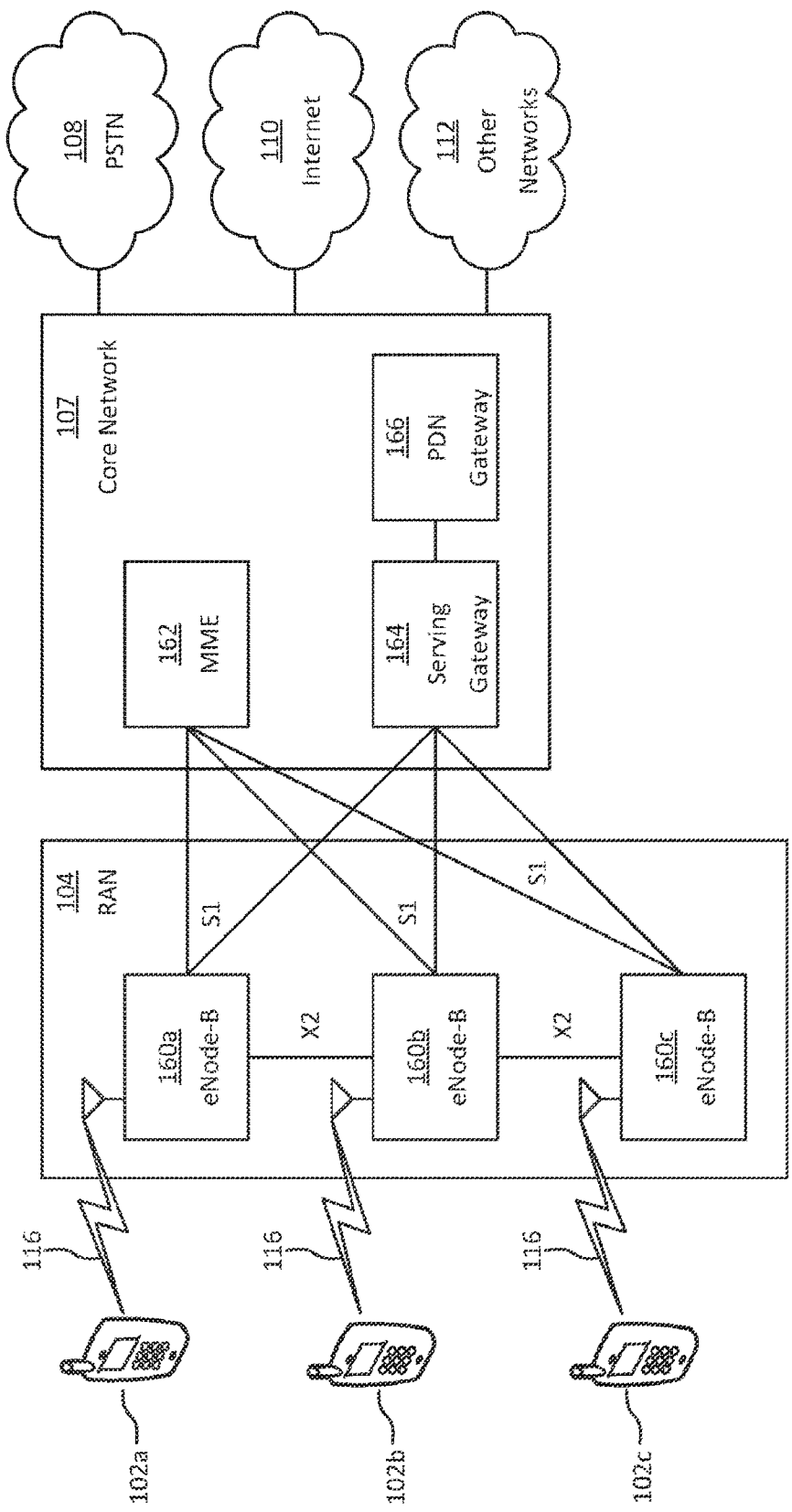
FIG. 10C illustrates an exemplary system that includes RANs and core networks.

FIG. 10C is a system diagram of an example RAN 104 and core network 107 that may implement methods, systems, and devices of redundant transmission in a wireless network, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 10C, the eNode-Bs 160a, 160b, and 160c may communicate with one another over an X2 interface.

The core network 107 shown in FIG. 10C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 10D:
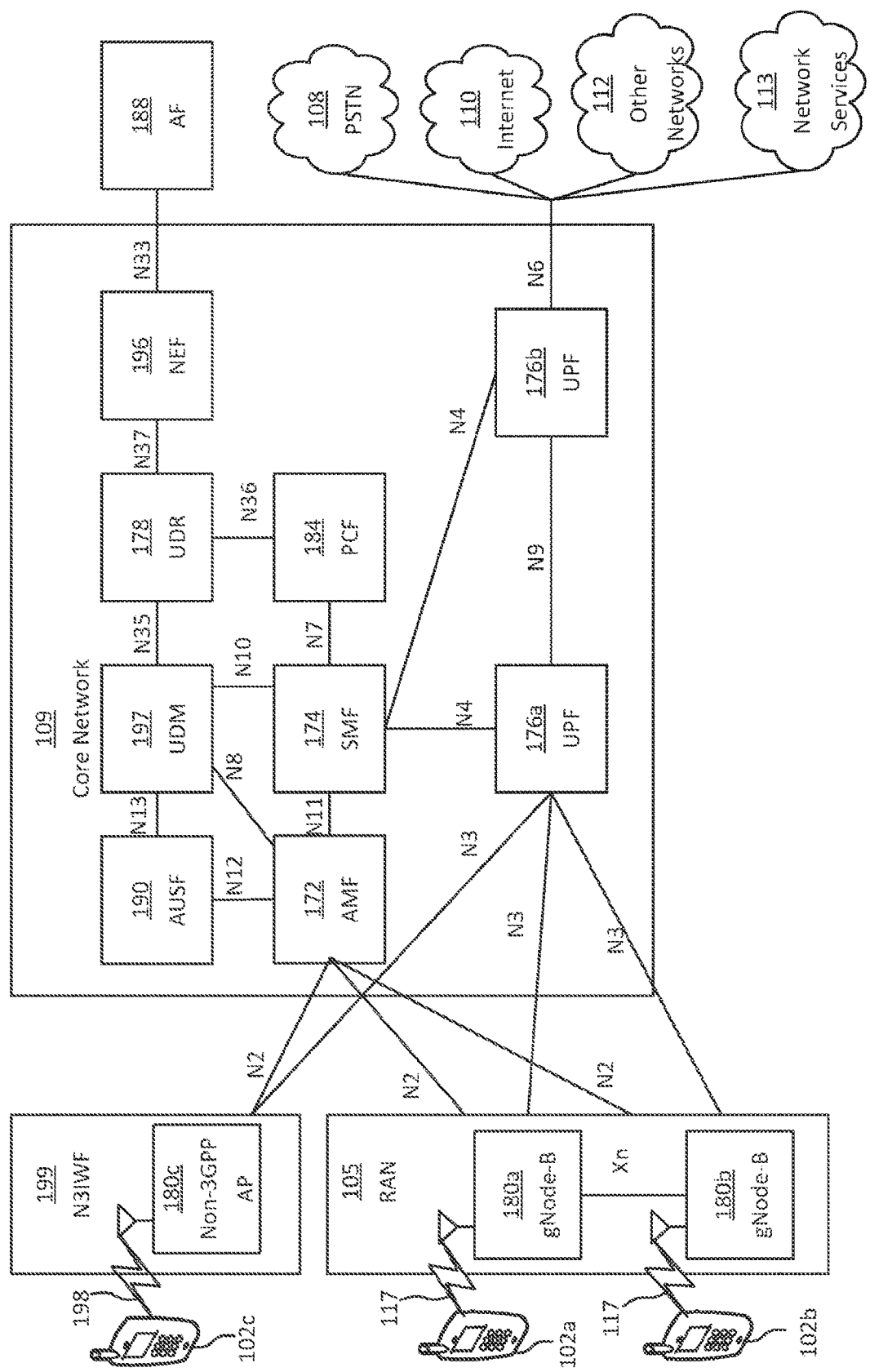
FIG. 10D illustrates an exemplary system that includes RANs and core networks.

FIG. 10D is a system diagram of an example RAN 105 and core network 109 that may implement methods, systems, and devices of redundant transmission in a wireless network, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 10D, the gNode-Bs 180a and 180b may communicate with one another over an Xn interface, for example.

The core network 109 shown in FIG. 10D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 10G.

In the example of FIG. 10D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not include all of these elements, may include additional elements, and may include multiple instances of each of these elements. FIG. 10D shows that network functions directly connect with one another, however, it should be appreciated that they may communicate via routing agents such as a diameter routing agent or message buses.

In the example of FIG. 10D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 10D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 10D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect with network functions, so that network function can add to, read from, and modify the data that is in the repository. For example, the UDR 178 may connect with the PCF 184 via an N36 interface. Similarly, the UDR 178 may connect with the NEF 196 via an N37 interface, and the UDR 178 may connect with the UDM 197 via an N35 interface.

The UDM 197 may serve as an interface between the UDR 178 and other network functions. The UDM 197 may authorize network functions to access of the UDR 178. For example, the UDM 197 may connect with the AMF 172 via an N8 interface, the UDM 197 may connect with the SMF 174 via an N10 interface. Similarly, the UDM 197 may connect with the AUSF 190 via an N13 interface. The UDR 178 and UDM 197 may be tightly integrated.

The AUSF 190 performs authentication related operations and connect with the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect with an AF 188 via an N33 interface and it may connect with other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 10D, in a network slicing scenario, a WTRU 102a, 102b, or 102c may connect with an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 10A, FIG. 10C, FIG. 10D, or FIG. 10E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 10A, FIG. 10B, FIG. 10C, FIG. 10D, or FIG. 10E are provided by way of example only, and it is understood that the subject matter disclosed and claimed herein may be embodied or implemented in any similar communication system, whether presently defined or defined in the future.

Figure 10E:
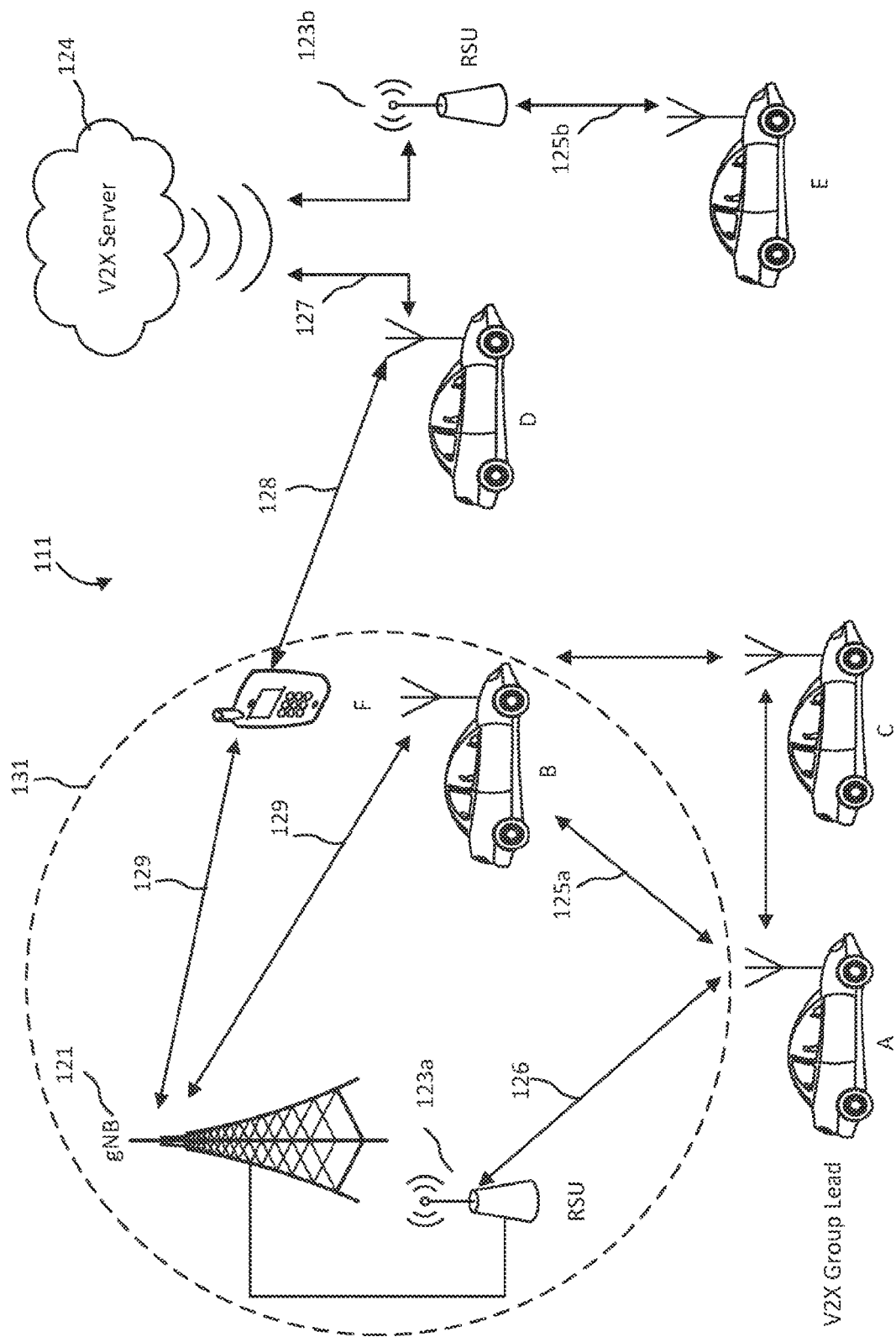
FIG. 10E illustrates another example communications system.

FIG. 10E illustrates an example communications system 111 in which the systems, methods, apparatuses that implement redundant transmission in a wireless network, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 10E, WTRUs B and F are shown within access network coverage 131. WTRUs A, B, C, D, E, and F may communicate with each other directly via a Sidelink interface (e.g., PC5 or NR PC5) such as interface 125*a*, 125*b*, or 128, whether they are under the access network coverage 131 or out of the access network coverage 131. For instance, in the example of FIG. 10E, WRTU D, which is outside of the access network coverage 131, communicates with WTRU F, which is inside the coverage 131.

WTRUs A, B, C, D, E, and F may communicate with RSU 123*a* or 123*b* via a Vehicle-to-Network (V2N) 133 or Sidelink interface 125*b*. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 10F:
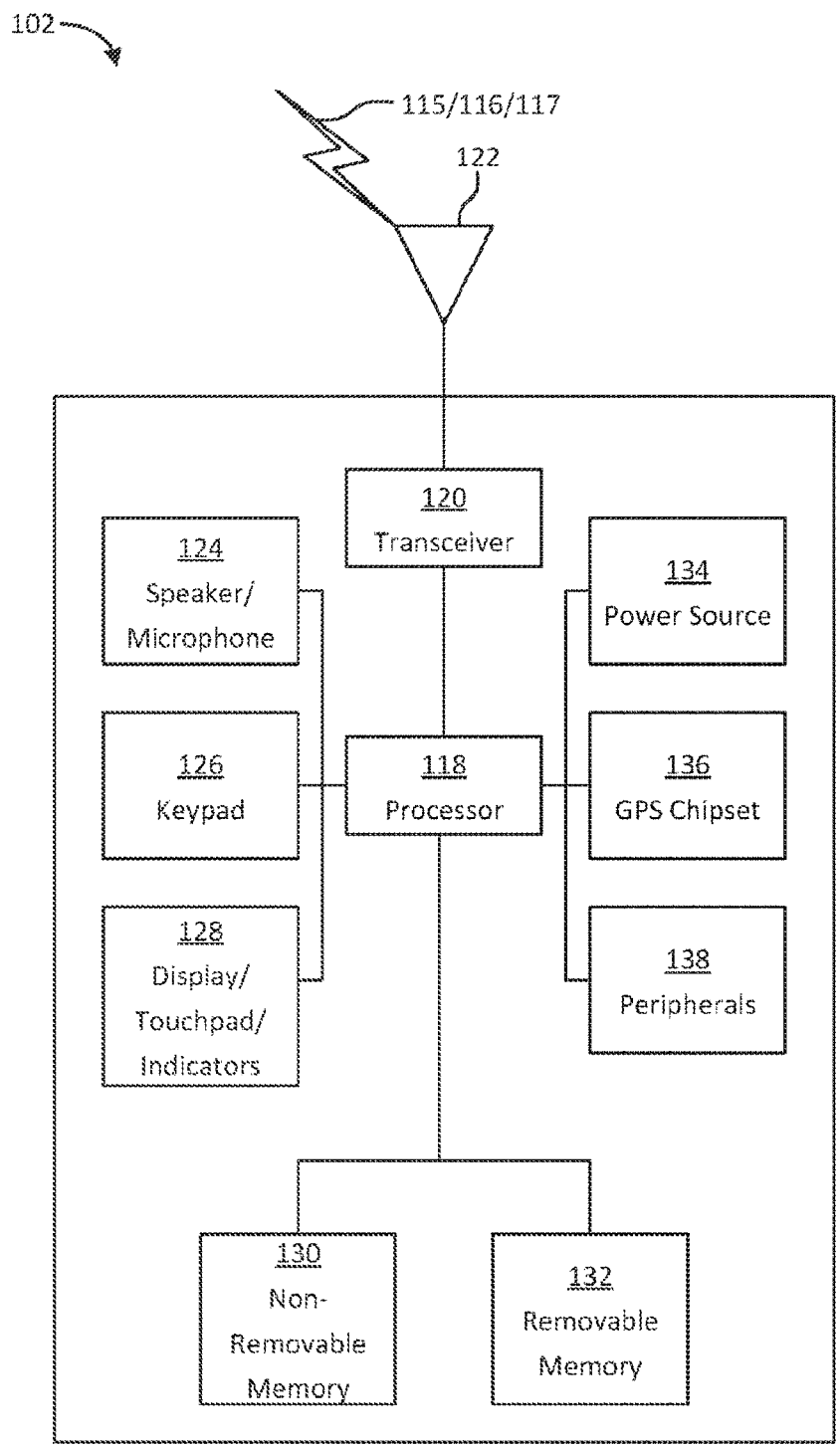
FIG. 10F is a block diagram of an example apparatus or device, such as a WTRU.

FIG. 10F is a block diagram of an example apparatus or device WTRU 102 that may be configured for wireless communications and operations in accordance with the systems, methods, and apparatuses that implement redundant transmission in a wireless network, described herein, such as a WTRU 102 of FIG. 10A, FIG. 10B, FIG. 10C, FIG. 10D, or FIG. 10E, or FIG. 1-FIG. 9 (e.g., UEs). As shown in FIG. 10F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114*a* and 114*b*, or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 10F and may be an exemplary implementation that performs the disclosed systems and methods for redundant transmission in a wireless network (e.g., 5G) described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 10F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114*a* of FIG. 10A) over the air interface 115/116/117 or another UE over the air interface 115*d*/116*d*/117*d*. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 10F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the redundant messages for some of the examples described herein are successful or unsuccessful, or otherwise indicate a status of redundant transmission in a wireless network and associated components. The control lighting patterns, images, or colors on the display or indicators 128 may be reflective of the status of any of the method flows or components in the FIG.'s illustrated or discussed herein (e.g., FIG. 6-FIG. 7, etc). Disclosed herein are messages and procedures of redundant transmission in a wireless network. The messages and procedures may be extended to provide interface/API for users to request resources via an input source (e.g., speaker/microphone 124, keypad 126, or display/touchpad/indicators 128) and request, configure, or query redundant transmission in a wireless network related information, among other things that may be displayed on display 128.

The processor 118 may receive power from the power source 134 and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect with other components, modules, or systems of such apparatuses or devices via one or more interconnect interfaces, such as an interconnect interface that may comprise one of the peripherals 138.

Figure 10G:
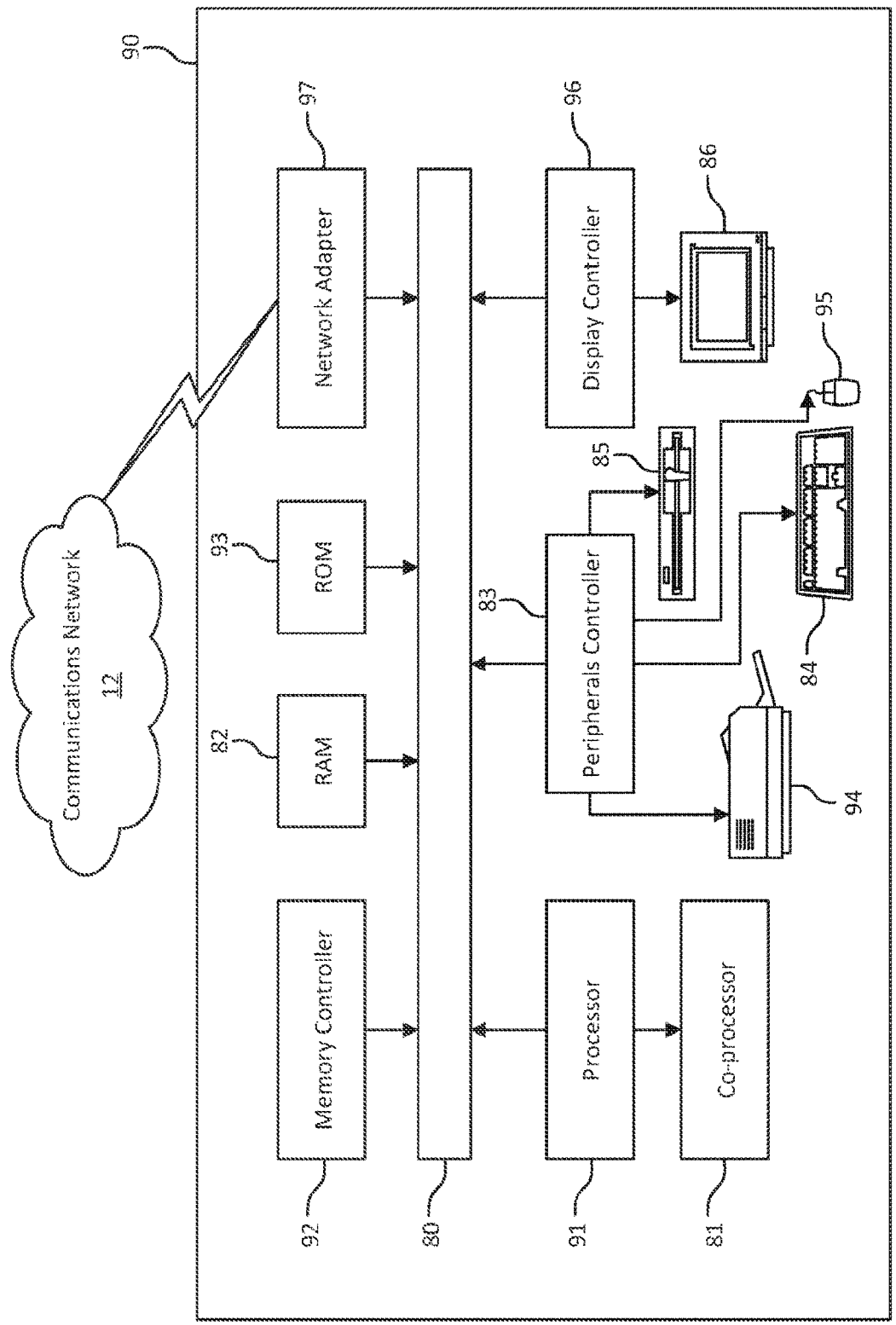
FIG. 10G is a block diagram of an exemplary computing system.

FIG. 10G is a block diagram of an exemplary computing system 90 in which one or more apparatuses of the communications networks illustrated in FIG. 10A, FIG. 10C, FIG. 10D and FIG. 10E as well as redundant transmission in a wireless network, such as the systems and methods illustrated in FIG. 1 through FIG. 9 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for redundant transmission in a wireless network (e.g., 5G), such as receiving or sending the redundant messages.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 10A, FIG. 10B, FIG. 10C, FIG. 10D, or FIG. 10E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—redundant transmission in a wireless network—as illustrated in the Figures, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples for the disclosed subject matter, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein).

Methods, systems, and apparatuses, among other things, as described herein may provide for redundant transmission in 5G network. A method, system, computer readable storage medium, or apparatus provides for triggering the PDU session modification process, which consequently triggers the stop redundant transmission; sending N2 SM message to SMF 1 to request the modification of PDU session 1; and forwarding the PDU session modification message to SMF 1. The steps may be executed by a user equipment (UE) or radio access network (RAN) node. A method, system, computer readable storage medium, or apparatus provides for receiving configuration information for assigning packet data unit (PDU) session pair information (PSPI) to one or more PDU sessions; using the configuration information to determine that a first PDU session and a second PDU session are associated; associating, based on the configuration, the first PSPI to the first PDU session and the second PDU session; sending, to a network, the PSPI in a first PDU session establishment message to establish the first PDU session; and sending, to the network, the PSPI in a second PDU session establishment message to establish the second PDU session. The first PDU session and second PDU session may be associated with different combinations of data network name (DNN) or single network slice selection assistance information (S-NSSAI). A method, system, computer readable storage medium, or apparatus provides for receiving packet data unit (PDU) session pair information (PSPI) for a first PDU session from a UE in a PDU Session Establishment Request message; and informing a RAN node that the first PDU Session is associated with a second PDU Session, wherein informing the RAN node that the first PDU session is associated with the second PDU session is performed by sending the PSPI to an AMF so that the AMF will forward the PSPI to a RAN node in an N2 message. All combinations in this paragraph (including the removal or addition of steps) are contemplated in a manner that is consistent with the other portions of the detailed description.

What is claimed is:

1. A user equipment comprising:
a processor; and
memory coupled with the processor, the memory comprising executable instructions stored thereon that when executed by the processor cause the processor to effectuate operations comprising:
receive user equipment route selection policy (URSP) rules associating application traffic to packet data unit (PDU) sessions and for detecting that application traffic is associated with a redundant transmission, wherein the URSP rules include at least two route selection descriptors (RSD);
use a first URSP rule to determine that first application traffic for a first PDU session is associated with a first RSD and a first transmission that is redundant to a second transmission;
use a second URSP rule to determine that second application traffic for a second PDU session is associated with a second RSD and the second transmission that is redundant to the first transmission;
determine PDU session pair information (PSPI) to associate with a first message associated with the first PDU session and to associate with a second message associated with the second PDU session;
send the PSPI in the first message associated with the first PDU session; and
send the PSPI in the second message associated with the second PDU session.

2. The user equipment of claim 1, wherein the application traffic is identified by a data network name or an IP address.

3. The user equipment of claim 1, wherein:
the first message comprises a first PDU session establishment message, and
the second message comprises a second PDU session establishment message.

4. The user equipment of claim 3, wherein the PSPI is determined by an upper layer.

5. The user equipment of claim 1, wherein the first PDU session is associated with a first redundancy sequence number (RSN) value, and the second PDU session is associated with a second RSN value.

6. The user equipment of claim 1, wherein the first PDU session is associated with transmission to a master radio access node (RAN) node of a dual connectivity link, and the second PDU session is associated with transmission to a secondary RAN node of the dual connectivity link.

7. The user equipment of claim 1, wherein the first PDU session is associated with a first user plane function (UPF) and the second PDU session is associated with a second UPF.

8. The user equipment of claim 1, wherein the PSPI is obtained via an AT command.

9. The user equipment of claim 1, wherein the first PDU session and second PDU session are associated with different combinations of data network name (DNN) or single network slice selection assistance information (S-NSSAI).

10. The user equipment of claim 1, wherein:
the URSP rules are configured to allow the user equipment to perform traffic duplication and elimination at a PDU layer;
duplicated traffic associated with a redundant PDU session is differentiated by two distinct traffic descriptors, each in a distinct URSP rule;
the URSP rules comprise a redundant transmission indicator and an N3/N9 redundancy indicator;
the first PDU session is associated with transmission to a master radio access node (RAN) node of a dual connectivity link, and the second PDU session is associated with transmission to a secondary RAN node of the dual connectivity link;
the PSPI is obtained via an AT command;
the processor is configured to determine the PSPI by an upper layer;
the first PDU session and second PDU session are associated with different combinations of data network name (DNN) or single network slice selection assistance information n(S-NSSAI); and
the PSPI is sent to a management function of a network.

11. A method performed by a user equipment, the method comprising:
receiving user equipment route selection policy (URSP) rules associating application traffic to packet data unit (PDU) sessions and for detecting that application traffic is associated with a redundant transmission, wherein the URSP rules include at least two route selection descriptors (RSD);
using a first URSP rule to determine that first application traffic for a first PDU session is associated with a first RSD and a first transmission that is redundant to a second transmission;
using a second URSP rule to determine that second application traffic for a second PDU session is associated with a second RSD and the second transmission that is redundant to the first transmission;
determining PDU session pair information (PSPI) to associate with a first message associated with the first PDU session and to associate with a second message associated with the second PDU session;
sending the PSPI in the first message associated with the first PDU session; and
sending the PSPI in the second message associated with the second PDU session.

12. The method of claim 11, wherein the application traffic is identified by a data network name or an IP address.

13. The method of claim 11, wherein:
the first message comprises a first PDU session establishment message, and
the second message comprises a second PDU session establishment message.

14. The method of claim 11, wherein the first PDU session is associated with a first redundancy sequence number (RSN) value, and the second PDU session is associated with a second RSN value.

15. The method of claim 11, wherein the first PDU session is associated with transmission to a master radio access node (RAN) node of a dual connectivity link, and the second PDU session is associated with transmission to a secondary RAN node of the dual connectivity link.

16. The method of claim 11, wherein the first PDU session is associated with a first user plane function (UPF) and the second PDU session is associated with a second UPF.

17. The method of claim 11, wherein the PSPI is obtained via an AT command.

18. The method of claim 17, further comprising determining the PSPI by an upper layer.

19. The method of claim 11, wherein the first PDU session and second PDU session are associated with different combinations of data network name (DNN) or single network slice selection assistance information (S-NSSAI).

20. The method of claim 11, wherein:
the URSP rules are configured to allow the user equipment to perform traffic duplication and elimination at a PDU layer;
duplicated traffic associated with a redundant PDU session is differentiated by two distinct traffic descriptors, each in a distinct URSP rule;
the URSP rules comprise a redundant transmission indicator and an N3/N9 redundancy indicator;
the first PDU session is associated with transmission to a master radio access node (RAN) node of a dual connectivity link, and the second PDU session is associated with transmission to a secondary RAN node of the dual connectivity link;
the PSPI is obtained via an AT command;
the PSPI is determined by an upper layer;
the first PDU session and second PDU session are associated with different combinations of data network name (DNN) or single network slice selection assistance information n(S-NSSAI); and
the PSPI is sent to a management function of a network.

21. A user equipment comprising:
a processor; and
memory coupled with the processor, the memory comprising executable instructions stored thereon that when executed by the processor cause the processor to effectuate operations comprising:
receive user equipment route selection policy (URSP) rules for detecting that application traffic is associated with redundant transmission, wherein the URSP rules comprise a first URSP rule and a second URSP rule, the first URSP rule comprises a first route selection descriptor (RSD), the second URSP rule comprises a second traffic descriptor, the first traffic descriptor comprises a first data network name (DNN), a first Internet Protocol (IP) descriptor, or a first non-IP descriptor, the second traffic descriptor comprises a second DNN, a second IP descriptor, or a second non-IP descriptor, and the first traffic descriptor is different than the second traffic descriptor;
determine to establish a first protocol data unit (PDU) session based on the first URSP rule and a second PDU session based on the second URSP rule, wherein the first and second PDU sessions are for redundant transmission of the application traffic;
determine PDU session pair information (PSPI) to associate with the first PDU session and the second PDU session;
send a first PDU session establishment message to establish the first PDU session, the first PDU session establishment message comprising the PSPI; and
send a first PDU session establishment message to establish the second PDU session, the second PDU session establishment message comprising the PSPI.

22. A method performed by a user equipment, the method comprising:
receiving user equipment route selection policy (URSP) rules for detecting that application traffic is associated with redundant transmission, wherein the URSP rules comprise a first URSP rule and a second URSP rule, the first URSP rule comprises a first route selection descriptor (RSD), the second URSP rule comprises a second traffic descriptor, the first traffic descriptor comprises a first data network name (DNN), a first Internet Protocol (IP) descriptor, or a first non-IP descriptor, the second traffic descriptor comprises a second DNN, a second IP descriptor, or a second non-IP descriptor, and the first traffic descriptor is different than the second traffic descriptor;

determining to establish a first protocol data unit (PDU) session based on the first URSP rule and a second PDU session based on the second URSP rule, wherein the first and second PDU sessions are for redundant transmission of the application traffic;

determining PDU session pair information (PSPI) to associate with the first PDU session and the second PDU session;

sending a first PDU session establishment message to establish the first PDU session, the first PDU session establishment message comprising the PSPI; and sending a first PDU session establishment message to establish the second PDU session, the second PDU session establishment message comprising the PSPI.

* * * * *